United States Patent
Guo et al.

(10) Patent No.: US 12,510,478 B2
(45) Date of Patent: Dec. 30, 2025

(54) FLUORESCENCE ENHANCEMENT FILMS FOR LUMINESCENT IMAGING

(71) Applicant: 3M INNOVATIVE PROPERTIES COMPANY, St. Paul, MN (US)

(72) Inventors: Xuexue Guo, St. Paul, MN (US); Henrik B. van Lengerich, St. Paul, MN (US); Joshua M. Fishman, Saint Louis Park, MN (US); Karl K. Stensvad, Eagan, MN (US); Cedric Bedoya, Woodbury, MN (US); Caleb T. Nelson, McKinney, TX (US); Kayla C. Niccum, Maplewood, MN (US); John A. Wheatley, Stillwater, MN (US); Jeffrey L. Solomon, Centerville, MN (US); Johah Shaver, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 151 days.

(21) Appl. No.: 18/549,244

(22) PCT Filed: Apr. 7, 2022

(86) PCT No.: PCT/IB2022/053295
§ 371 (c)(1),
(2) Date: Sep. 6, 2023

(87) PCT Pub. No.: WO2022/215038
PCT Pub. Date: Oct. 13, 2022

(65) Prior Publication Data
US 2024/0151646 A1 May 9, 2024

Related U.S. Application Data

(60) Provisional application No. 63/200,991, filed on Apr. 7, 2021.

(51) Int. Cl.
*G01N 33/52* (2006.01)
*G01N 21/64* (2006.01)

(52) U.S. Cl.
CPC ..... *G01N 21/6428* (2013.01); *G01N 21/6456* (2013.01); *G01N 33/525* (2013.01); *G01N 2021/6439* (2013.01)

(58) Field of Classification Search
CPC .......... G01N 21/6428; G01N 21/6456; G01N 33/525; G01N 2021/6439; G01N 21/6452
See application file for complete search history.

(56) References Cited

U.S. PATENT DOCUMENTS 6,696,157 B1   2/2004  David et al.
7,442,442 B2  10/2008  Strobel et al.
(Continued)

FOREIGN PATENT DOCUMENTS

WO    2022058845 A1    3/2022

OTHER PUBLICATIONS

Bucher, "Tailoring Photoluminescence from MoS2 Monolayers by Mie-Resonant Metasurfaces", ACS Photonics, 2019, vol. 6, pp. 1002-1009.
(Continued)

*Primary Examiner* — David J Makiya
*Assistant Examiner* — Mamadou Faye
(74) *Attorney, Agent, or Firm* — Philip P. Soo

(57) ABSTRACT

Luminescent imaging films (100) for fluorescent enhancement and methods of making and using the same are provided. The films (100) include a flexible carrier layer (1109, and a pattern of photonic structure (120) disposed on the flexible carrier layer, which is interspersed with an anti-biofouling material (130) to provide a pattern of analyte sites (132). The pattern of photonic structure includes a patterned high-refractive-index dielectric material surface
(Continued)

(123) so as to provide resonance at the excitation or emission wavelength to enhance a fluorescence signal from labeled analytes.

20 Claims, 19 Drawing Sheets

(56) References Cited

U.S. PATENT DOCUMENTS

| | | | |
|---|---|---|---|
| 8,664,323 | B2 | 3/2014 | Iyer et al. |
| 10,059,992 | B2 | 8/2018 | Dehlinger et al. |
| 2005/0221072 | A1* | 10/2005 | Dubrow .............. A61L 27/3821 |
| | | | 428/292.1 |
| 2008/0240543 | A1 | 10/2008 | Budach et al. |
| 2009/0111169 | A1 | 4/2009 | Kim et al. |
| 2013/0229378 | A1 | 9/2013 | Iyer et al. |
| 2014/0315760 | A1* | 10/2014 | Ratner ............... G01N 21/7703 |
| | | | 506/18 |
| 2016/0041093 | A1* | 2/2016 | Yen ...................... G01N 21/648 |
| | | | 356/244 |
| 2018/0073065 | A1 | 3/2018 | Bowen et al. |
| 2018/0326412 | A1 | 11/2018 | Rothberg et al. |
| 2019/0112711 | A1 | 4/2019 | Lyons et al. |
| 2019/0170904 | A1 | 6/2019 | Topolancik et al. |
| 2022/0003676 | A1* | 1/2022 | Mazed ................. G01N 21/658 |

OTHER PUBLICATIONS

Chen, "Metamaterials Application in Sensing", Sensors, vol. 12, No. 3, Feb. 2012, pp. 2742-2765.
Cunningham, "Photonic Crystals Utilized for Label-Free and Amplified Fluorescence Biodetection", SPIE, 2008, vol. 6959, pp. 695910/1-695910/12.
Elhadj, "Optical Properties of an Immobilized DNA Monolayer from 255 to 700 nm", Langmuir, 2004, vol. 20, pp. 5539-5543.
Ganesh, "Enhanced Fluorescence Emission from Quantum Dots on a Photonic Crystal Surface", Nature Nanotechnology, Aug. 2007, vol. 2, pp. 515-520.
Hsu, "Bound states in the continuum", Nature Reviews Materials 1, 2016, Article No. 16048.
International Search report for PCT International Application No. PCT/IB2022/053295, mailed on Jun. 28, 2022, 6 pages.
Koshelev, "Asymmetric Metasurfaces with High-Q Resonances Governed by Bound States in the Continuum", Physical Review Letters 121, 2018, pp. 193903/1-193903/6.
Liu, "High-Q Quasibound States in the Continuum for Nonlinear Metasurfaces", Physical Review Letters, 2019, vol. 123, pp. 253901/1-253901/6.
Liu, "Light-Emitting Metasurfaces: Simultaneous Control of Spontaneous Emission and Far-Field Radiation", Nano Letters, 2018, vol. 18, pp. 6906-6914.
Pitruzzello, "Photonic Crystal Resonances for Sensing and Imaging", Journal of Optics, 2018, vol. 20, pp. 073004/1-073004/23.
Pokhriyal, "Photonic Crystal Enhanced Fluorescence Using a Quartz Substrate to Reduce Limits of Detection", Optics Express, Nov. 2010, vol. 18, No. 24, pp. 24793-24808.
Romano, "Surface-Enhanced Raman and Fluorescence Spectroscopy with an All-Dielectric Metasurface", The Journal of Physical Chemistry C, 2018, vol. 122, pp. 19738-19745.
Semmlinger, Generating Third Harmonic Vacuum Ultraviolet Light with a TiO2 Metasurface, Nano Letters, 2019, vol. 19, pp. 8972-8978.
Sharma, "Optical Biosensing with Electromagnetic Nanostructures", Reviews in Physics 5, 2020, pp. 100044/1-100044/22.
Vaskin, "Light-Emitting Metasurfaces", Nanophotonics, 2019, vol. 8, pp. 1151-1198.
Yang, "Nonlinear Fano-Resonant Dielectric Metasurfaces", Nano letters, 2015, vol. 15, pp. 7388-7393.
Zhao, "Mie Resonance-Based Dielectric Metamaterials", Materials today, Dec. 2009, vol. 12, No. 12, pp. 60-69.

\* cited by examiner

FIG. 7A  FIG. 7B

FLUORESCENCE ENHANCEMENT FILMS FOR LUMINESCENT IMAGING

CROSS REFERENCE TO RELATED APPLICATIONS

This application is a national stage filing under 35 U.S.C. 371 of PCT/IB2022/053295, filed 7 Apr. 2022, which claims the benefit of U.S. Application No. 63/200,991, filed 7 Apr. 2021, the disclosure of which is incorporated by reference in its/their entirety herein.

BACKGROUND

Next-generation sequencing (NGS) is a disruptive technology for understanding the complexity and diversity of genomes in health and disease research and applications. The main sequencing technique on the market relies on fluorescence microscopy to read different types of nucleotides. In the process called sequencing by synthesis (SBS), fluorophore-labelled nucleotides bind to DNA templates or clusters on a substrate through natural complementarity. Then under illumination each DNA cluster emits a color indicating which nucleotide is incorporated.

SUMMARY

There is a desire to increase imaging resolution in luminescent imaging. One platform is to use densely packed wells on a substrate to precisely define the location and size of analytes (e.g., DNA clusters) on the substrate. When the reaction sites on the substrate get smaller, the fluorescence signals from the analytes at the reaction sites become weaker, which may impose challenges to fluorescence detection. Also, the smaller reaction sites may lead to higher error rates and more complex and expensive detection instrumentation.

Briefly, in one aspect, the present disclosure describes a film a flexible carrier layer having a first major surface and a second major surface opposite the first major surface; a pattern of photonic structure disposed on the first major surface of the flexible carrier layer; and an anti-biofouling material disposed on the first major surface of the flexible carrier layer, the photonic structure being interspersed with the anti-biofouling material to provide a pattern of analyte sites. The pattern of photonic structure comprises a layer of high-refractive-index dielectric material to support one or more analytes at the analyte sites. The analytes are labeled by at least one type of fluorophore having an excitation or emission wavelength, and the photonic structure is configured to be resonant at the excitation or emission wavelength to enhance a fluorescence signal from the labeled analytes.

In another aspect, the present disclosure describes a luminescent imaging device including one or more of luminescent imaging films described herein, an excitation light source configured to emit an excitation light toward the photonic structure of the luminescent imaging film, and a detection unit configured to obtain an image of the pattern of photonic structure of the luminescent imaging film.

In another aspect, the present disclosure describes a method of making a film. The method includes providing a flexible carrier layer having a first major surface and a second major surface opposite the first major surface; providing a pattern of photonic structure disposed on the first major surface of the flexible carrier layer; and providing an anti-biofouling material disposed on the first major surface of the flexible carrier layer, the photonic structure being interspersed with the anti-biofouling material to provide a pattern of analyte sites. The pattern of photonic structure includes a layer of high-refractive-index dielectric material to support one or more analytes at the analyte sites.

Various unexpected results and advantages are obtained in exemplary embodiments of the disclosure. One such advantage of exemplary embodiments of the present disclosure is that significant luminescence enhancement arisen from the resonant modes of high-refractive-index dielectric photonic structures described herein. Another advantage is that the photonic structures can shape the luminescence spatial distribution and therefore increasing the collection efficiency of the luminescence detection instrument, such as a microscope.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 7A is a schematic top view of a luminescent imaging film for Example 1.

FIG. 7B is a schematic cross-sectional view of the luminescent imaging film for Example 1.

Figure 1:
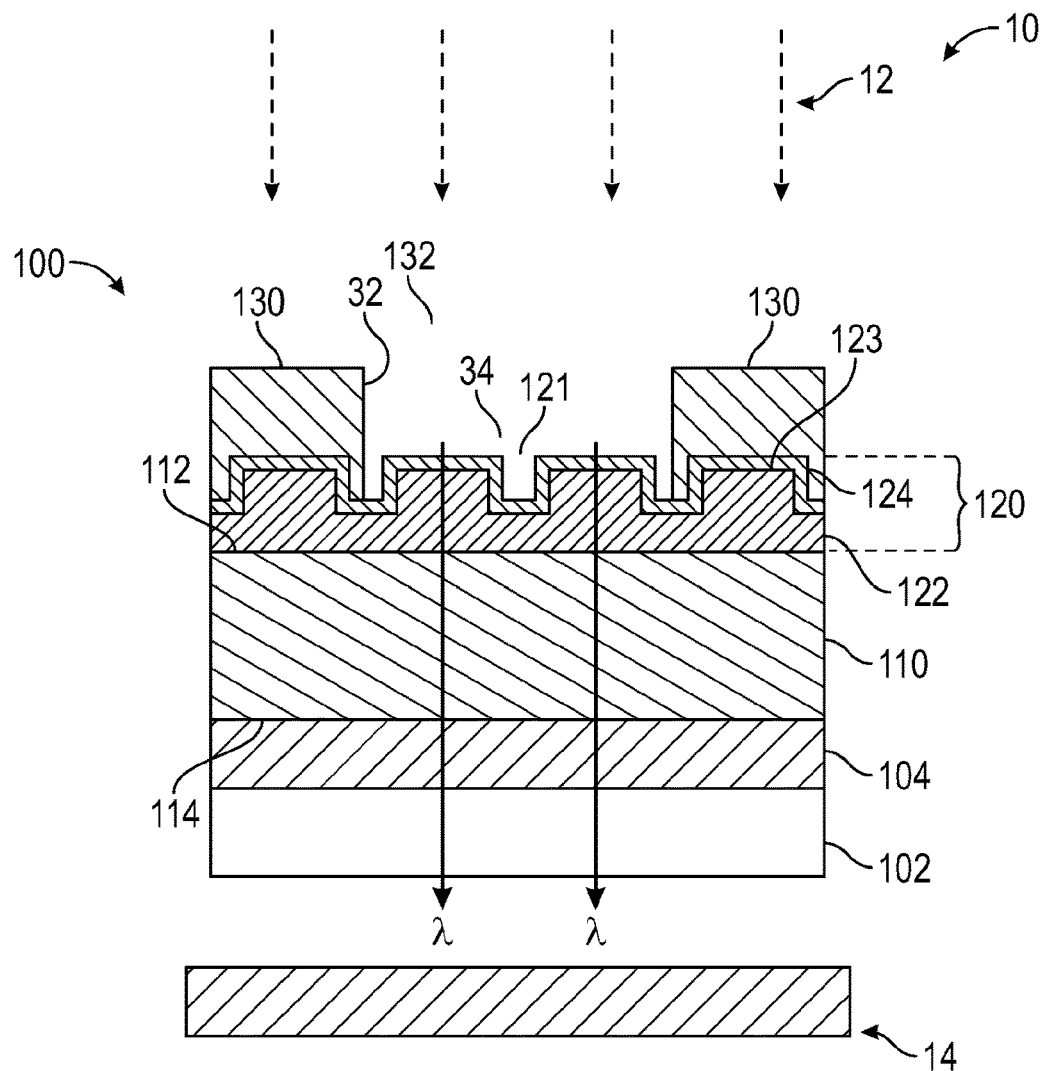
FIG. 1 is a schematic diagram of a luminescent imaging device, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

The terms "photonic structure" refers to a periodically ordered pattern with a period of the order of the light wavelength of an excitation light source.

The term "photonic crystal structure" refers to a periodic photonic structure that is designed to form the energy band structure for photons, which either allows or forbids the propagation of electromagnetic waves of certain frequency ranges.

The term "asymmetric metamaterial structure" refers to an artificially engineered photonic structure with asymmetric constituent.

The term "high-refractive-index dielectric material" or "high-refractive-index dielectrics" refers to solid dielectric materials with high refractive indices, typically greater than the refractive index of glass ($SiO_2$), and are optically transparent. Examples of high-refractive-index dielectric materials include $Al_2O_3$, $TiO_2$, $Ta_2O_5$, $ZrO_2$, $Nb_2O_5$, $Si_3N_4$, $HfO_2$, any of their combinations, etc.

The term "luminescent" refers to spontaneous emitting of light from a substance not resulting from heat. In general, luminescence occurs when an energy source displaces electrons from the ground states to the excited states; then electrons give out energy in the form of radiation as they return to the ground states. The term "bioluminescent" refers to one particular type of luminescence where the energy source comes from biochemical reactions. "Fluorescence" is caused by the absorption of photons. It can be perceived as the emission of photons by a substance at one wavelength as a result of illuminating the substance at a wavelength shorter than the emission wavelength.

The term "nucleotide" or "nucleic acid" is intended to mean a molecule that includes a sugar and a phosphate group, and a nucleobase.

The terms "about" or "approximately" with reference to a numerical value or a shape means+/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g., 1 to 5 includes 1, 1.5, 2, 2.75, 3, 3.8, 4, and 5). Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof. Various exemplary embodiments of the disclosure will now be described with particular reference to the Drawings.

Figure 2:
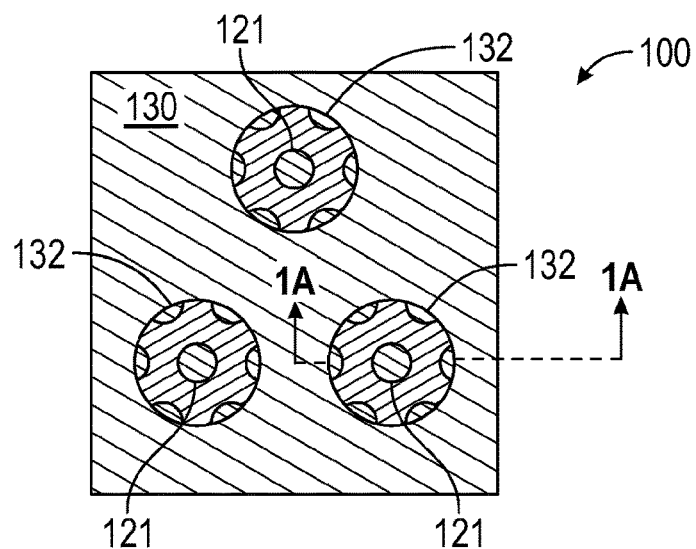
FIG. 2 is a schematic top view of a luminescent imaging film of FIG. 1, according to one embodiment.

FIG. 1 is a schematic diagram of a luminescent imaging device 10, according to one embodiment. The luminescent imaging device 10 includes a luminescent imaging film 100. It is to be understood that the luminescent imaging device 10 may include one or more luminescent imaging films or articles described herein. FIG. 2 is a schematic top view of the luminescent imaging film 100 of FIG. 1, according to one embodiment. An excitation light source 12 is configured to emit an excitation light toward the photonic structure of the luminescent imaging film. A detection unit 14 is configured to receive the fluorescence emission from the analyte sites and obtain an image of analyte sites on a pattern of photonic structure of the luminescent imaging film. In some embodiments, the device 10 can work in a transmission mode where the detection unit 14 is disposed on the side of the luminescent imaging film 100 opposite the excitation light source 12. In some embodiments, the device 10 can work in a reflection mode where the detection unit 14 and the excitation light source 12 are disposed on the same side of the luminescent imaging film 100.

The luminescent imaging film 100 includes a flexible carrier layer 110 having a first major surface 112 and a second major surface 114 opposite the first major surface 112. A pattern of photonic structures 120 is disposed on the first major surface 112 of the flexible carrier layer 110. A layer of anti-biofouling material 130 is selectively disposed on the pattern of photonic structures 120 on the first major surface 112 of the flexible carrier layer 110. An array of openings or wells 132 are formed in the layer of anti-biofouling material 130 to expose the respective underneath photonic structures 120. The pattern of photonic structures 120 are interspersed with the anti-biofouling material 130 to provide a pattern of analyte sites (e.g., the exposed surfaces of the photonic structures 120 via the wells 132). In the present disclosure, the pattern of photonic structure 120 includes a high-refractive-index dielectric surface to support one or more analytes at the analyte sites.

In the embodiment depicted in FIGS. 1 and 2, the layer of anti-biofouling material 130 resides on a continuous layer of photonic structure 120, forming the array of wells 132 as the analyte sites. The wells 132 thus include walls 32 and a floor 34 at the analyte sites. The wells 132 may have various shapes such as, for example, circles, ellipses, squares, rectangles, triangles, polygons, etc. The edges of the wells, if polygonal, can optionally be beveled, rounded, eased or otherwise modified. The wells 132 may have an average depth along the thickness dimension of the film 100 in a range, for example, from about 5 nm to about 1000 nm above the peaks of the photonic structures 120. The wells 132 may have an average lateral dimension in a range, for example, from about 25 nm to about 10 micrometers. The lower limit of the lateral dimension may be determined by the desired microscope resolution.

In some embodiments, the analytes at the analyte sites 132 can be labeled by at least one type of fluorophore having an excitation or emission wavelength. In some embodiments, the analytes may be bound directly to a high index layer at the analyte sites if the analytes are modified to bind to it or there is a DNA primer attached. The patterned dielectric surface of the photonic structures 120 is configured to be resonant at the excitation or emission wavelength. Significant luminescence enhancement can arise from the resonant modes of high-refractive-index dielectric photonic structures. The excitation light source 12 can excite resonant modes of photonic structures, leading to enhanced local field inside and close to the photonic structures. Fluorophore labelled analytes lying in the strong field region absorb photons and emit fluorescence. When the emission spectra also overlap with the resonant mode, the enhanced emission distribution can be shaped to be directional towards the detectors, and thus increasing the collection efficiency. In addition, the photonic structures can shape the luminescence spatial distribution and therefore increasing the collection efficiency of the luminescence detection instrument, such as a microscope. For example, when the dispersion of the guided-mode resonances (GMR) mode of a photonic structure is close to the F-point band-edge, i.e., the in-plane wavevector is close to 0, and the fluorescence emission spectra overlap with the GMR wavelength, most of the emission will be directed within a small angular range along the surface normal, and thus facilitating the detection of fluorescence.

In some embodiments, a tie layer with reactive functionality is condensed within the dielectric surface of the photonic structures 120. The reactive functionality is selected to grow an analyte binding layer on the dielectric surface of the photonic structures 120, or to graft an analyte binding layer to the dielectric surface. Suitable reactive functional groups for the tie layer include, but are not limited to, silanes, epoxides, oxiranes, aziridines, isocyanates, alcohols, thiols, amines, chloromethylbenzyl, bromomethylbenzyl, iodomethylbenzyl, alkyl halides, vinyl, carbonyls such as aldehydes and ketones, carboxylic acids, esters, azides, sulfates, phosphates, alkenes, alkynes, (meth)acrylates, (meth)acrylamides, norbornenes, diazonium salts, hydrazines, hydrazones, oximes, halogens, hydroxyls, tetrazoles, tetrazines and mixtures and combinations thereof. In some embodiments, the functional group is a photoreactive functional group such as benzophenone, aryl azide, halogenated aryl azide, diazos, or azos that can be used to grow or graft the analyte binding layer using radical chemistry. Often the tie layer has at least one silane, phosphate, thiol or carboxylate. In some embodiments, norbornene silanes or amino silanes have been found to be particularly useful.

In some examples, the condensed reactive silane functionality is selected to provide a covalent bond at an interface between the dielectric surface of the photonic structures 120 and the analyte binding layer. For example, the analyte binding layer can be covalently bound to the dielectric surface of the photonic structures 120 through reaction with the condensed functional silane having any of the reactive functional groups listed above. Suitable examples of functional silanes include, but are not limited to, an acrylate silane, an aminosilane, an acrylamide silane, a norbornene silane, and mixtures and combinations thereof.

An analyte binding layer may include reactive functionality selected to bind with a target analyte. In some cases, the reactive functionality can be the same or different with respect to the reactive functionality used to covalently bind to the dielectric surface of the photonic structures. In various embodiments, which are not intended to be limiting, the reactive functional groups of the analyte binding layer are selected to bind biomolecules chosen from amino acids, nucleosides, nucleotides, peptides, oligonucleotides, polynucleotides, nucleic acids, proteins, carbohydrates, secondary metabolites, pharmaceutical molecules and mixtures and combinations thereof, as well as undesirable chemical contaminants found in liquid aqueous streams and water supplies. In some cases, the biomolecules are modified with chemistry that facilitate covalent attachment to the analyte binding layer. In some cases, the biomolecule can be used to bind additional analytes. For example, not intending to be limiting, the molecule is an oligonucleotide primer or a mixture of oligonucleotide primers that can bind complementary DNA or RNA molecules, an antibody, or a carbohydrate that can bind a lectin. In some embodiments, the analyte binding layer 20 may include a polymer or hydrogel. Exemplary polymers and hydrogels were described in U.S. Patent Application No. 63/078,850 (to Fishman et al.,), which is incorporated herein by reference.

The anti-biofouling layer 130 can include any material that resists or prevents accumulation or formation of biological species such as, for example, microorganisms, or biomolecules such as nucleic acids and proteins. The anti-biofouling layer 130 thus prevents target analytes, sequencing reagents or fluorophores from non-specifically adhering to at least a portion of the interstitial regions between the wells 132. When the anti-biofouling material is applied in a particular region of a luminescent imaging film, other regions uncoated by the anti-biofouling material may be bound with a biological sample. The anti-biofouling material thus provides specific placement of the analyte binding material (and the biological material bound thereto) in one or more areas of luminescent imaging films described herein.

In the depicted embodiment of FIGS. 1 and 2, the pattern of photonic structures 120 is formed by an inorganic nanostructured layer 124 supported by a polymer layer 122. The polymer layer 122 is disposed on the first major surface 112 of the flexible carrier layer 110. The polymer layer 122 has a nanostructured surface 123 including an array of nanowells 121 formed thereon. The inorganic nanostructured layer 124 can be substantially conformally formed onto the nanostructured surface 123 of the polymer layer 122. The inorganic nanostructured layer 124 is a continuous layer that covers the entire surface 123. Then, the inorganic nanostructured layer 124 is selectively covered by the anti-biofouling material 130 to provide the analyte sites (e.g., the wells 132). Examples of anti-biofouling materials include fluorinated compounds such as fluoropolymers, non-aromatic hydrocarbon polymers, cyclic olefin polymers (COP), cyclic olefin copolymers, cyclic block copolymers, silicones with non-oxidized surface chemistry, and mixtures and combinations thereof. In some examples, the anti-biofouling layer includes an exposed upper layer of methyl groups deposited through plasma enhanced chemical vapor deposition (PECVD) of hexamethyldisiloxane.

The flexible carrier layer 110 may include a polymeric material chosen from, for example, cyclic olefin polymer (COP), cyclic olefin copolymers (COCs), biaxially oriented polypropylene (BOPP), poly(meth)acrylates and copolymers, polyamides, polyesters, polycarbonates, hydrogenated styrenics, polyimides, and combinations thereof.

The polymer layer 122 including the structured surface 123 can be provided on the first major surface 112 of the flexible carrier layer 110 by any suitable process such as a roll-to-roll process. Continuous processing, which in some cases is also referred to as roll-to-roll processing, can provide technical advantages and increased design flexibility relative to silicon wafer processing techniques when producing a nanostructured substrate or surface. The nanostructured surface 123 of the polymer layer 122 can be formed by any suitable processes. In some embodiments, the surface 123 of the polymer layer 122 may be structured by a wide variety of processes including, for example, microreplication against a structured tool, casting, imprint lithography, photolithography, microcontact or inkjet printing, chemical treatment, laser patterning, and combinations thereof. In some embodiments, the inorganic nanostructured layer 124 may be formed by vapor deposition methods such as physical vapor deposition, including sputtering and evaporation, chemical vapor deposition (CVD), including the techniques of CVD, plasma enhanced CVD, atomic layer deposition (ALD) and plasma assisted atomic layer deposition (PAALD), and combinations thereof.

The polymer layer 122 may include thermosets such as those cured with either heat, electron beam, or actinic radiation. Examples of thermoset materials are (meth)acrylates, epoxies, silicones, etc. The polymer layer 122 may include thermoplastics such as polycarbonate, polypropylene, polymethyl methacrylate etc. The polymer layer 122 may include resins that can be solvated and dried such as fluoropolymers. The polymer layer 122 may have a thickness in a range from 10 nm to 50 microns as measured from the valley of the structured surface 123 to the first major surface 112 of the flexible carrier layer 110. Optionally, by patterning the flexible carrier layer 110, the polymer layer 122 could be the same material as the flexible carrier layer 110.

The inorganic nanostructured layer 124 is substantially conformally formed onto the nanostructured surface 123 of the polymer layer 122 by any suitable process such as, for example, atomic layer deposition (ALD), sputtering or PECVD technology, etc. In some example embodiments, the inorganic layer 124 may have a thickness of less than about 200 nm, or less than about 100 nm, or less than about 50 nm. The inorganic nanostructured layer 124 may have a refractive index n in a range, for example, from about 1.7 to about 2.8, or from about 1.7 to about 2.4 at the wavelength of 400 nm to 700 nm.

In some embodiments, the inorganic nanostructured layer 124 may include one or more high refractive index materials such as, for example, $TiO_2$, $Al_2O_3$, $Ta_2O_5$, $ZrO_2$, $Nb_2O_5$, $Si_3N_4$, $HfO_2$, etc. The composition of the inorganic layer may vary widely. In some examples, the inorganic nanostructured layer 124 may include a skin layer on top of the high refractive index material to aid in bonding of a tie layer. The skin layer may include, for example, silicon oxides such as $SiO_2$, SiCxOy or SiAlxOy, as well as TiO, aluminum oxides AlOx, Au, Pt, Al, Ag, and mixtures and combinations thereof. In contrast to traditional wafer processing, amorphous metal oxide deposited by roll-to-roll processing may include impurities such as aluminum or carbon, which can make possible more efficient deposition rates on flexible, temperature sensitive surfaces using, for example, sputtering or PECVD technology.

A luminescent imaging film described herein can include an optional adhesive layer such as the adhesive layer 104 in FIGS. 1-5B disposed on the second major surface 114 of the flexible carrier layer 110 opposite the polymer layer 122. Any adhesive may be used in the adhesive layer, but low auto-fluorescent materials have been found to be particularly suitable for use in analytical devices for biochemical analytes. In some examples, which are not intended to be limiting, the adhesive layer includes optically clear adhesives (OCA) such as those available from 3M under the trade designation 3M OPTICALLY CLEAR ADHESIVE 8171, as well as polyisobutylene polymer adhesives. Suitable isobutylene adhesives can include styrene-isobutylene copolymers, or with multifunctional components such as (meth) acryl and vinyl ether groups.

The adhesive layer can be applied on the second major surface 114 of the flexible carrier layer 110 using a wide variety of techniques including, coating directly on the surface 114, or via lamination of a transfer adhesive to the flexible carrier layer 110. The adhesive layer may have a thickness of about 1 micrometer to about 50 micrometers, or about 5 micrometers to about 15 micrometers. In some embodiments, the adhesive layer may be sufficiently uniform so that a focal plane of the exposed surfaces of the photonic structure 120 does not vary by more than about 5 micrometers, or more than about 2 micrometers, or more than about 1 micrometers, 500 nm, 250 nm or 100 nm.

The adhesive layer can be attached to an optional reinforcing layer or rigid substrate 102, which may provide increased rigidity so the film 100 can be more readily used in commonly utilized in apparatus for performing biochemical assays. The reinforcing layer 102 may vary widely, and in various embodiments includes silicon, glass, plastic, metal, metal oxide, paper, and combinations thereof. In various embodiments, the reinforcing layer 102 may include a single layer or multiple layers.

In some embodiments, the reinforcing layer 102 can be a release liner that protects the adhesive layer 104, and may be peeled away from the adhesive layer 104 such that the film 100 can be applied to a selected substrate prior to use in an apparatus for performing biochemical assays. Suitable release liners may include, for example, polymeric films, paper, metals, metal oxides, and combinations thereof. The release liner 102 may include single or multiple layers.

In some embodiments, the reinforcing layer 102 can be a flow-cell substrate. Suitable flow-cell substrates can include a transparent substrate, e.g., glass, to support the polymeric film and allow light to transmit through for excitation, emission detection, or both.

Figure 3A:
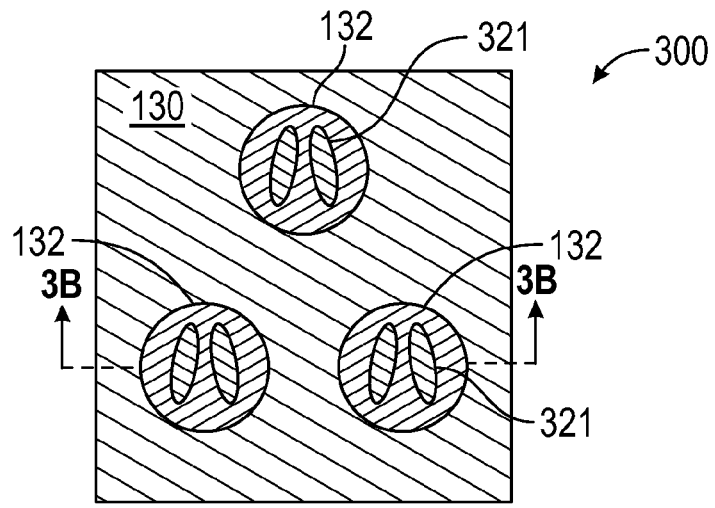
FIG. 3A is a schematic top view of a luminescent imaging film, according to another embodiment.
Figure 3B:
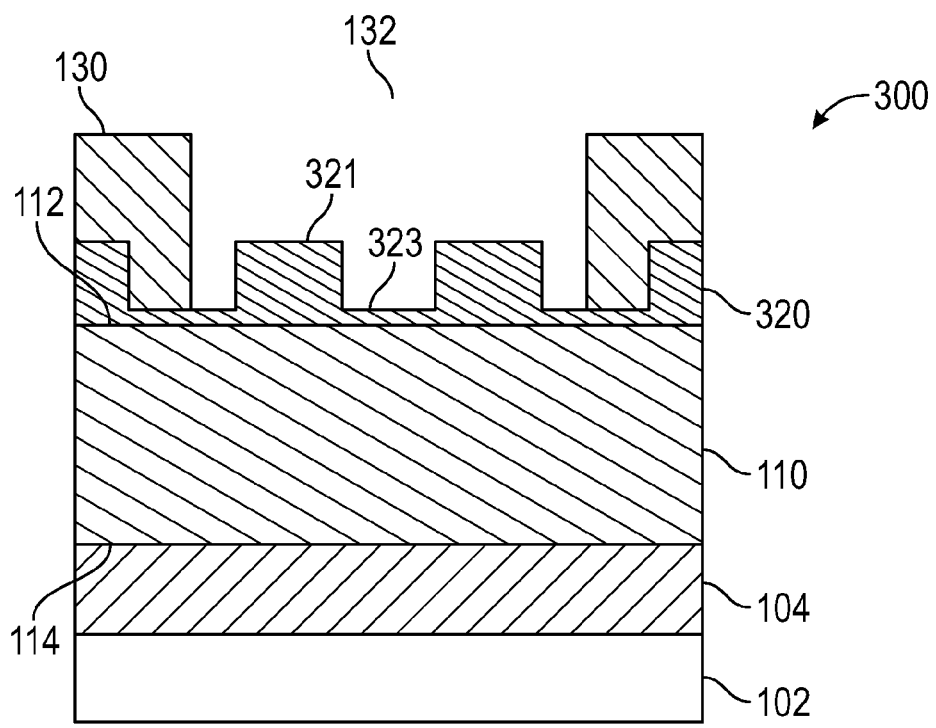
FIG. 3B is a schematic cross-sectional view of the luminescent imaging film of FIG. 3A.

FIG. 3A is a schematic top view of a luminescent imaging film 300, according to another embodiment. FIG. 3B is a schematic cross-sectional view of the luminescent imaging film 300 of FIG. 3A along the line 3B-3B. The luminescent imaging film 300 includes a flexible carrier layer 110 having a first major surface 112 and a second major surface 114 opposite the first major surface 112. A pattern of photonic structures 320 is directly disposed on the first major surface 112 of the flexible carrier layer 110. A layer of anti-biofouling material 130 is selectively disposed on the photonic structures 320. An array of openings or wells 132 are formed in the layer of anti-biofouling material 130 to expose the respective underneath photonic structures 320. The pattern of photonic structures 320 are interspersed with the anti-biofouling material 130 to provide a pattern of analyte sites (e.g., the exposed surfaces of photonic structures 320 via the wells 132). In the present disclosure, the pattern of photonic structure 320 includes a high-refractive-index dielectric surface to support one or more analytes at the analyte sites.

In the depicted embodiment of FIGS. 3A-B, the pattern of photonic structures 320 is formed by an inorganic nanostructured layer directly supported by the flexible carrier layer 110. The inorganic nanostructured layer 320 is directly disposed on the first major surface 112 of the flexible carrier layer 110. The inorganic nanostructured layer 320 has a nanostructured surface 323 including an array of asymmetric metamaterial structures 321 formed thereon. The asymmetric metamaterial structures 321 project from the nanostructured surface 323. The inorganic nanostructured layer 320 is a continuous layer that covers at least a portion of the first major surface 112 of the flexible carrier layer 110. Then, the inorganic nanostructured layer 320 is selectively covered by the anti-biofouling material 130 to provide the analyte sites (e.g., the wells 132). The inorganic nanostructured layer 320 may include one or more high refractive index materials such as, for example, $TiO_2$, $Al_2O_3$, $Ta_2O_5$, $ZrO_2$, $Nb_2O_5$, $Si_3N_4$, $HfO_2$, etc.

Figure 4A:
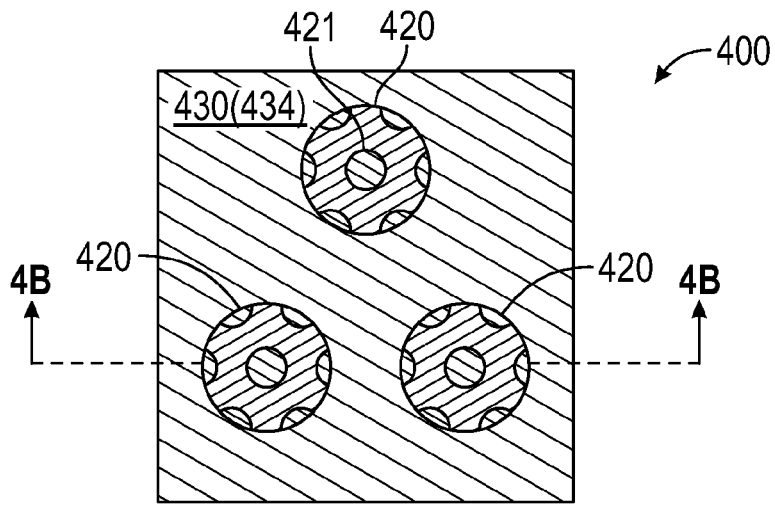
FIG. 4A is a schematic top view of a luminescent imaging film, according to another embodiment.
Figure 4B:
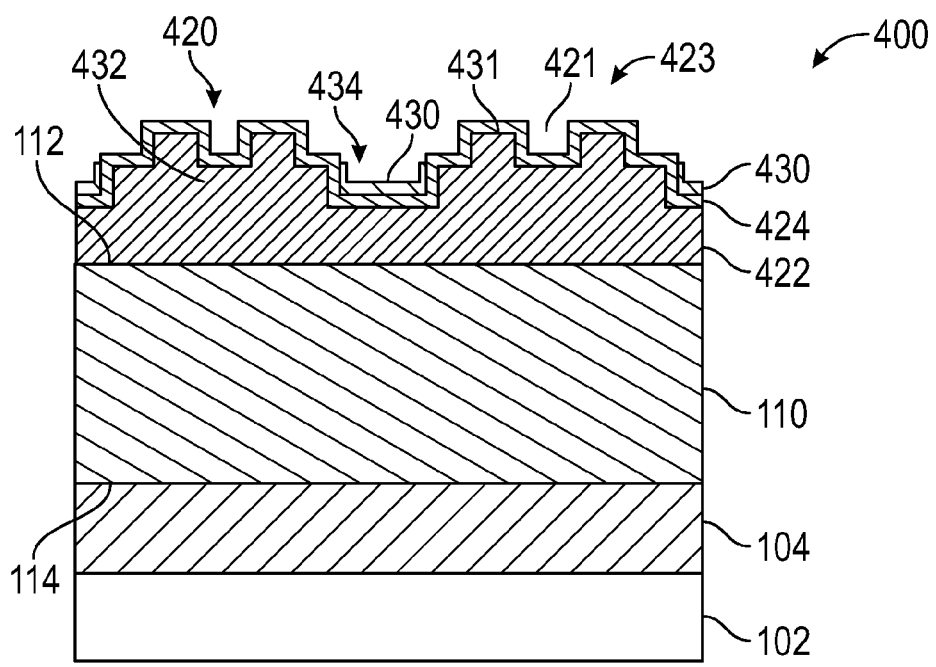
FIG. 4B is a schematic cross-sectional view of the luminescent imaging film of FIG. 4A.

FIG. 4A is a schematic top view of a luminescent imaging film 400, according to another embodiment. FIG. 4B is a schematic cross-sectional view of the luminescent imaging film 400 of FIG. 4A. A polymer layer 422 is disposed on the first major surface 112 of the flexible carrier layer 110. The polymer layer 422 has a structured surface 423 including an array of posts 432 interspersed with recessed features 434. The recessed features 434 are covered by an anti-biofouling material 430. In some embodiments, the recessed features 434 may be a methylated surface, for example, a hexamethyldisiloxane (HMDSO) treated surface, where the presence of the anti-biofouling methyl groups on the inorganic layer is shown schematically as material 430. The structured surface 423 including the posts and recessed features can be made by any suitable processes, for example, the structure can be created by imprint lithography using a multi-level tool, and the surface chemistry can be oxidized by reactive ion etching in the presence of oxygen. Exemplary processes were described in U.S. Patent Application No. 63/078,850 (to Fishman et al.,), which is incorporated herein by reference.

The top surfaces of the posts 432 each have a nanostructured surface 431 including an array of nanowells 421 formed thereon. A pattern of photonic structure 420 is disposed on the top surfaces of the posts 432. The pattern of photonic structure 420 includes an inorganic nanostructured layer 424 that is substantially conformally formed onto the structured surface 423 of the polymer layer 422.

In some embodiments, the surface 423 of the polymer layer 422 may be structured by a wide variety of processes including, but not limited to, microreplication against a structured tool, casting, microcontact or inkjet printing, chemical treatment, laser patterning, and combinations thereof. In some embodiments, which are provided as an example, the arrangement of structures 432 includes a regular array of cylindrical or cuboid posts with a diameter d of about 50 nm to about 10,000 nm, or about 200 nm and 7500 nm, and height h above the surface 13 of greater than 0 nm and up to about 1000 nm, or about 50 nm to about 200 nm. In some example embodiments, the posts have an aspect ratio (height:diameter) of about 5:1 to about 1:70, or about 5:1 to 1:5, or about 2:1 to 1:1. The array of posts 432 may occupy all or selected portions of the surface 423 of the polymer layer 422.

Figure 5A:
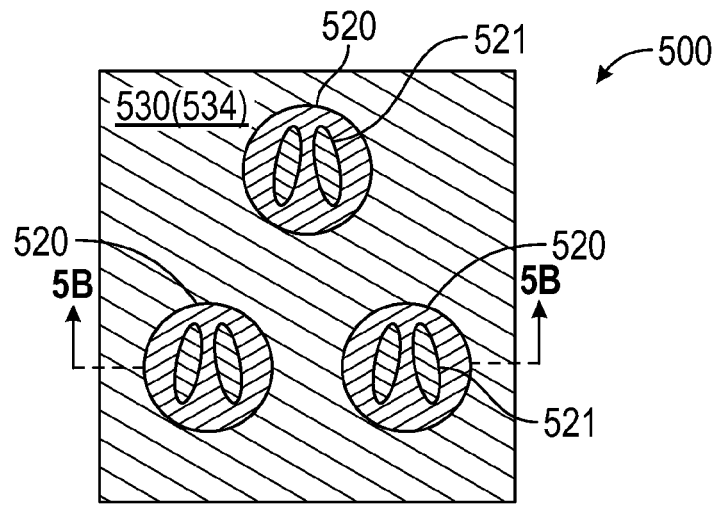
FIG. 5A is a schematic top view of a luminescent imaging film, according to another embodiment.
Figure 5B:
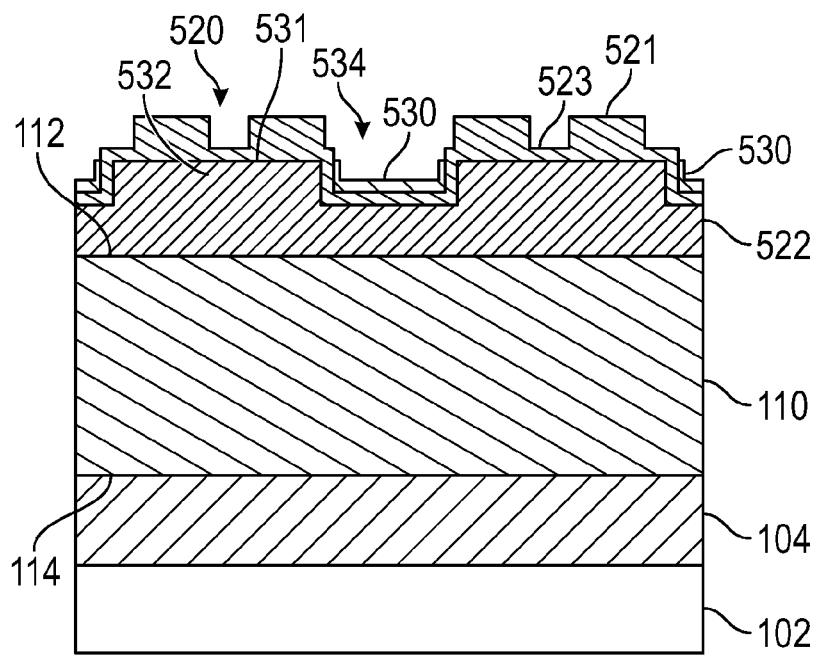
FIG. 5B is a schematic cross-sectional view of the luminescent imaging film of FIG. 5A.

FIG. 5A is a schematic top view of a luminescent imaging film 500, according to another embodiment. FIG. 5B is a schematic cross-sectional view of the luminescent imaging film 500 of FIG. 5A. A polymer layer 522 is disposed on the first major surface 112 of the flexible carrier layer 110. The polymer layer 522 has a structured surface 523 including an array of posts 532 interspersed with recessed features 534. The recessed features 534 are covered by an anti-biofouling material 530. A pattern of photonic structure 520 is disposed on the top surfaces of the posts 532. The pattern of photonic structures 520 is formed by an inorganic nanostructured layer directly disposed on the polymer layer 522. The inorganic nanostructured layer 520 has a nanostructured surface 523 including an array of asymmetric metamaterial structures 521 formed on the top surfaces 531 of the posts 532. The asymmetric metamaterial structures 521 project from the top surfaces of the posts 532. The surface 523 of the polymer layer 522 may be structured by a wide variety of processes including, but not limited to, microreplication against a structured tool, casting, microcontact or inkjet printing, chemical treatment, laser patterning, and combinations thereof.

Figure 6:
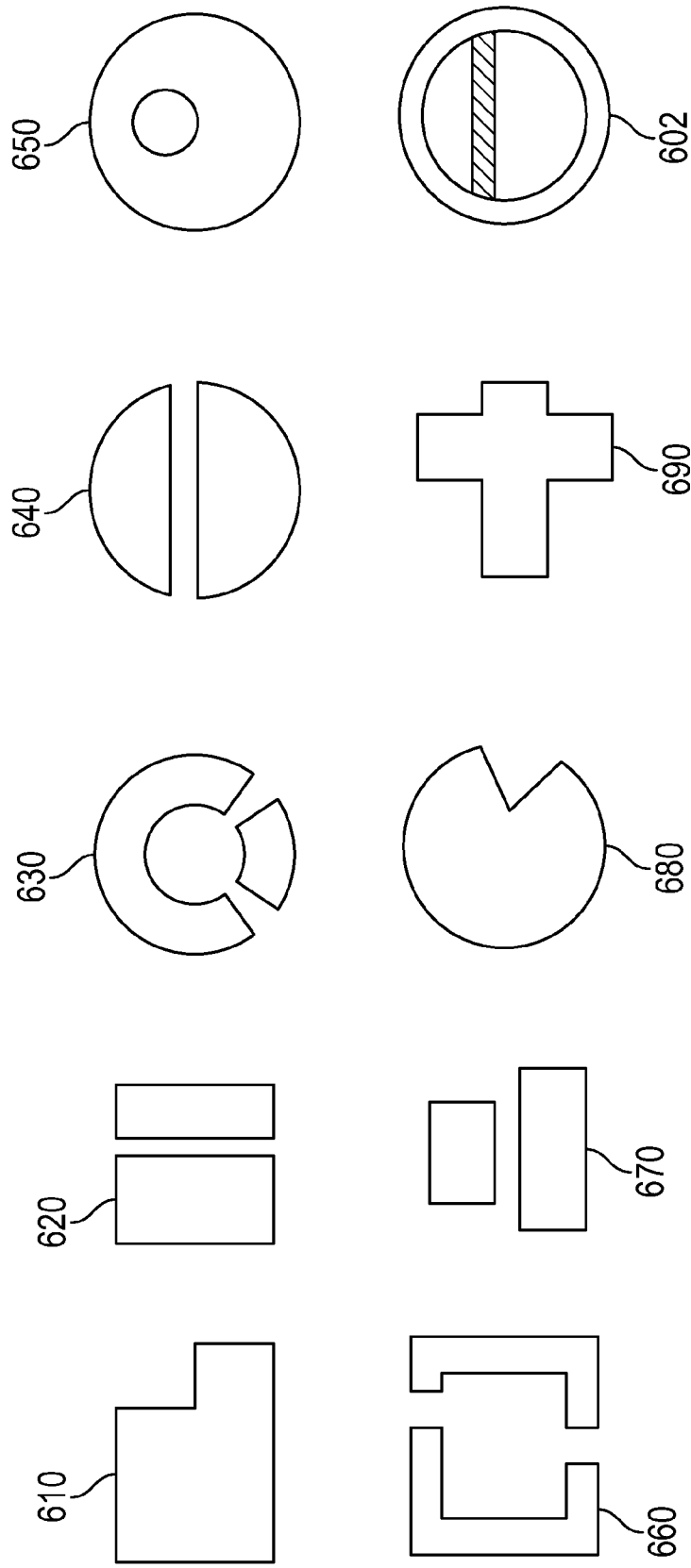
FIG. 6 is a schematic top view of geometries for asymmetric metamaterials, according to some embodiments.

A pattern of photonic structures at analyte sites of a luminescent imaging film described herein may include at least one of a photonic crystal structure or an asymmetric metamaterial structure. In one embodiment, a photonic crystal structure used herein may include a hexagonal array of nano-wells or nano-posts. In one embodiment, asymmetric metamaterials may include a periodic array of asymmetric nanostructures such as shown in FIG. 6.

In some embodiments, a pattern of photonic structures may include a periodic photonic crystal (PhC) structure. The periodic patterning of photonic crystal materials, such as high-index dielectrics, in the proximity of fluorescently marked biomolecules at the analyte sites can enhance a fluorescence signal. One- or two-dimensionally periodic index contrast can be introduced into a high refractive index guiding layer. The resonant properties of PhCs stem from the Bragg scattering from a periodic structure when the lattice constant is comparable to the wavelength of light. These resonant modes are called guided-mode resonances (GMRs). They are strongly confined in the slab and can couple to external radiation channels. The resonances can correspond to the excitation or emission wavelengths of fluorophores, and lead to enhancement for fluorophore excitation, fluorescence collection, or both. It is to be understood that the proper selection of excitation spectra, fluorophores and the design of the photonic structures can be conducted for an optimized enhancement effect. A non-optimized selection of these aspects may lead to reduced performance.

In the depicted embodiment of FIGS. 1 and 2, the pattern of photonic structures 120 includes a periodic array of nanowells 121 disposed at the analyte sites (e.g., the wells 132). In the depicted embodiment of FIGS. 4A-B, the pattern of photonic structures 420 includes a periodic array of nanowells 421 disposed at the analyte sites (e.g., on the top surfaces 431 of the posts 432). The nanowells may have an average lateral dimension in a range, for example, from 25 nm to 500 nm, or from 80 nm to 200 nm. The nanowells may have an average depth in a range, for example, from 50 nm to 200 nm. The nanowells may have various shapes such as circles, ellipses, squares, rectangles, triangles, polygons, etc. The nanowells may have various lattice structure such as square lattice and hexagonal lattice.

The periodic array of nanowells may have a pitch in a range from 300 nm to 400 nm, which may depend from the fluorescence wavelengths used for detection. As used herein, the term "pitch," when used in reference to features of a pattern (e.g. photonic structure) or array, is intended to refer to the center-to-center spacing for adjacent features of the pattern or array. A pattern of features can be characterized in terms of average pitch. The average pitch of the nanowells 121 can be, for example, at least about on the order of the wavelength of light in the material. For example, the average pitch can be in the range of a few nanometers to a micrometer. It is to be understood that in a pattern of photonic structures, different types of features can have different pitches and patterns than one another.

In some embodiments, a pattern of photonic structures may include an asymmetric metamaterial structure. The asymmetric metamaterial structure may include a periodic array of asymmetric nanostructures, e.g., an array of unit cell structures with a broken in-plane inversion symmetry. The unit cell structures project from a major surface thereof. The asymmetric metamaterial structure supports a strong resonant mode called quasi-Bound State in the Continuum (Quasi-BIC). BIC is a nonradiative and localized mode embedded in the continuum of radiative modes that can carry energy away. With the introduction of asymmetry to nanostructures, BIC mode can be accessed by free-space excitation and leads to the so-called quasi-BIC mode. Once the excitation light source is coupled to the quasi-BIC mode, highly confined local field can be created. Fluorophores in close proximity to the nanostructure absorb the excitation light and emit fluorescence signals, and the fluorescence enhancement factor scales linearly with the local intensity enhancement factor. When the resonant wavelength overlaps with the emission spectra of the fluorophore, it also opens pathways for the emitted light to escape into free space, thus increasing the extraction efficiency of the emission.

In the depicted embodiment of FIGS. 3A and 3B, the asymmetric metamaterial structure 320 is disposed at the analyte sites (e.g., the wells 132). The asymmetric unit cell structure 321 of the asymmetric metamaterial structure 320 include a pair of ellipses with an in-plane rotation. In the depicted embodiment of FIGS. 5A-B, the asymmetric metamaterial structure 520 is disposed at the analyte sites (e.g., on the top surfaces of the posts 532). The asymmetric unit cell structure 521 of the asymmetric metamaterial structure 520 include a pair of ellipses with an in-plane rotation. The pitch size may have an average lateral dimension in a range, for example, from 300 nm to 500 nm. The ellipses may have an average minor radius in a range, for example, from 25 nm to 100 nm, and an average major radius in a range, for example, from 100 nm to 400 nm. The ellipses may have an average height in a range, for example, from 50 nm to 500 nm. The in-plane rotation angle is greater than 0 degree, and vary in a range of 0 to 30 degrees.

It is to be understood that the metamaterial structure at the analyte sites may have any suitable asymmetric unit cell structures (e.g., shapes or geometries) other the ellipses. In some embodiments, the asymmetric unit cell structures may include a split ring resonator. In some embodiments, the asymmetric unit cell structures may include a double gap square slit ring resonator. FIG. 6 is a schematic top view of geometries for exemplary unit cell structures of asymmetric metamaterials, according to some embodiments. The unit cell 610 is a nano-block with a protruding segment. The unit cell 620 is a nano-block with an off-center slit. The unit cell 630 is a split ring resonator. The unit cell 640 is a nanodisk with an off-center slit. The unit cell 650 is a nanodisk with an off-center hole. The unit cell 660 is a double gap split wire. The unit cell 670 is a double-blocks of different widths. The unit cell 680 is a nanodisk with a missing segment. The unit cell 690 is a cross wire. The unit cell 602 is a ring with an off-center bar. The examples show various types of asymmetry, either by adding a segment to the symmetric structure, or by subtracting a segment from the symmetric structure. The quality factor of the resonance has an inverse quadratic dependence on the asymmetry parameter. By controlling the asymmetry parameter, optimized resonant enhanced local field can be achieved.

Films and devices described herein can be used for multicolor fluorescence signal enhancement from analytes (e.g. DNA clusters) in multiple excitation and/or luminescence emission bands at normal incidence of excitation. The luminescent imaging films/devices described herein are compatible with previously known epifluorescence microscopy and microscope scanning systems (such as those in commercially available sequencing platforms such as produced by Illumina, Inc. (San Diego, California, U.S.A)) or BGI Genomics (Shenzhen, China) or in gene arrays or gene chips such as produced by Thermo Fisher Scientific (Santa Clara, California, USA), Agilent Technologies, Inc. (Santa Clara, California, USA), Eppendorf (Hamburg, Germany) or Applied Microarrays (Tempe, Arizona, USA) that, in some circumstances, can use multiple fluorescent dyes excited at normal and imaged at normal incidence in various spectral windows. It is to be understood that the films, devices, and the methods of making and using the same in the present disclosure suitably can be used in any type of luminescent imaging or any other suitable application, and are not limited to use in sequencing polynucleotides such as DNA.

Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Listing of Exemplary Embodiments

Embodiment 1 is a luminescent imaging film comprising:
 a flexible carrier layer having a first major surface and a second major surface opposite the first major surface;
 a pattern of photonic structure disposed on the first major surface of the flexible carrier layer; and
 an anti-biofouling material disposed on the first major surface of the flexible carrier layer, the photonic structure being interspersed with the anti-biofouling material to provide a pattern of analyte sites,
 wherein the pattern of photonic structure comprises a layer of high-refractive-index dielectric material to support one or more analytes at the analyte sites.

Embodiment 2 is the film of embodiment 1, wherein the analytes are labeled by at least one type of fluorophore having an excitation or emission wavelength, the pattern of photonic structure being configured to be resonant at the excitation or emission wavelength.

Embodiment 3 is the film of embodiment 1 or 2, wherein the photonic structure comprises at least one of a photonic crystal structure or an asymmetric metamaterial structure.

Embodiment 4 is the film of embodiment 3, wherein the photonic crystal structure comprises a periodic array of nanowells.

Embodiment 5 is the film of embodiment 4, wherein the nanowells have an average lateral dimension in a range from 80 nm to 200 nm.

Embodiment 6 is the film of embodiment 4 or 5, wherein the periodic array of nanowells has a pitch in a range from 300 nm to 400 nm.

Embodiment 7 is the film of embodiment 3, wherein the asymmetric metamaterial structure comprises an array of unit cell structures with a broken in-plane inversion symmetry, the unit cell structures projecting from a major surface thereof.

Embodiment 8 is the film of embodiment 7, wherein the asymmetric unit cell structures comprise a pair of ellipses with an in-plane rotation.

Embodiment 9 is the film of embodiment 7 or 8, wherein the asymmetric unit cell structures comprise a split ring resonator.

Embodiment 10 is the film of any one of embodiments 7-9, wherein the asymmetric unit cell structures comprise a double gap square slit ring resonator.

Embodiment 11 is the film of any one of embodiments 1-10, wherein the high-refractive-index dielectric material has a refractive index in a range from 1.7 to 2.8 at the wavelength of 400 nm to 700 nm.

Embodiment 12 is the film of any one of embodiments 1-11, wherein the high-refractive-index dielectric material comprises an inorganic nanostructured layer, optionally, the inorganic nanostructured layer comprises at least one of $TiO_2$, $Al_2O_3$, $Ta_2O_5$, $ZrO_2$, $Nb_2O_5$, $Si_3N_4$, or $HfO_2$.

Embodiment 13 is the film of embodiment 12, wherein the pattern of photonic structure further comprises a polymer layer comprising a nanostructured surface, and the inorganic nanostructured layer is substantially conformally formed onto the nanostructured surface of the polymer layer.

Embodiment 14 is the film of any one of embodiments 1-13, wherein the anti-biofouling material forms an array of wells aligned with the pattern of analyte sites.

Embodiment 15 is the film of any one of embodiments 1-14, further comprising a polymer layer disposed on the first major surface of the flexible carrier layer, the polymer layer comprising an array of posts interspersed with recessed features, the pattern of photonic structure being disposed on top surfaces of the posts, and the anti-biofouling material being disposed on the recessed features.

Embodiment 16 is the film of any one of embodiments 1-15, further comprising a coating or polymer disposed on the analyte sites to bind an analyte binding material.

Embodiment 17 is the film of embodiment 16, wherein the analyte binding material is configured to bind biomolecules.

Embodiment 18 is the film of embodiment 17, wherein the analyte binding material comprises at least one of a DNA template, a primer, or an aptamer.

Embodiment 19 is the film of any one of embodiments 1-18, further comprising an optically clear adhesive layer disposed on the second major surface of the flexible carrier layer.

Embodiment 20 is the film of embodiment 19, further comprising a release liner disposed on the optically clear adhesive layer.

Embodiment 21 is the film of embodiment 19 or 20, further comprising a flow cell substrate disposed on the optically clear adhesive layer.

Embodiment 22 is a luminescent imaging device comprising:
 the luminescent imaging film any of one of embodiments 1-21;
 an excitation light source configured to emit an excitation light toward the photonic structure of the luminescent imaging film; and
 a detection unit configured to obtain an image of the pattern of photonic structure of the luminescent imaging film.

Embodiment 23 is a method of making a luminescent imaging film, the method comprising:
 providing a flexible carrier layer having a first major surface and a second major surface opposite the first major surface;
 providing a pattern of photonic structure disposed on the first major surface of the flexible carrier layer; and
 providing an anti-biofouling material disposed on the first major surface of the flexible carrier layer, the photonic structure being interspersed with the anti-biofouling material to provide a pattern of analyte sites, wherein the pattern of photonic structure comprises a layer of high-refractive-index dielectric material to support one or more analytes at the analyte sites.

Embodiment 24 is the method of embodiment 23, wherein the analytes are labeled by at least one type of fluorophore having an excitation or emission wavelength, the pattern of photonic structure being configured to be resonant at the excitation or emission wavelength.

Embodiment 25 is the method of embodiment 23 or 24, wherein the photonic structure comprises at least one of a photonic crystal structure or an asymmetric metamaterial structure.

Embodiment 26 is the method of embodiment 24 or 25, wherein the photonic crystal structure comprises a periodic array of nanowells.

Embodiment 27 is the method of embodiment 26, wherein the nanowells have an average lateral dimension in a range from 80 nm to 200 nm.

Embodiment 28 is the method of embodiment 26 or 27, wherein the periodic array of nanowells has a pitch in a range from 300 nm to 400 nm.

Embodiment 29 is the method of any one of embodiments 25-28, wherein the asymmetric metamaterial structure comprises an array of unit cell structures with a broken in-plane inversion symmetry, the unit cell structures projecting from a major surface thereof.

Embodiment 30 is the method of embodiment 29, wherein the asymmetric unit cell structures comprise a pair of ellipses with an in-plane rotation.

Embodiment 31 is the method of embodiment 29 or 30, wherein the asymmetric unit cell structures comprise a split ring resonator.

Embodiment 32 is the method of any one of embodiments 29-31, wherein the asymmetric unit cell structures comprise a double gap square slit ring resonator.

Embodiment 33 is the method of any one of embodiments 23-32, wherein the pattern of photonic structure comprises an inorganic nanostructured layer.

Embodiment 34 is the method of embodiment 33, wherein the inorganic nanostructured layer comprises at least one of $TiO_2$, $Al_2O_3$, $Ta_2O_5$ or $ZrO_2$, $Nb_2O_5$, $Si_3N_4$, or $HfO_2$.

Embodiment 35 is the method of embodiment 34, wherein the pattern of photonic structure further comprises a polymer layer comprising a nanostructured surface, and the inorganic nanostructured layer is substantially conformally formed onto the nanostructured surface of the polymer layer.

Embodiment 36 is the method of any one of embodiments 23-35, wherein the anti-biofouling material forms an array of wells aligned with the pattern of analyte sites.

Embodiment 37 is the method of any one of embodiments 23-36, further comprising disposing a polymer layer disposed on the first major surface of the flexible carrier layer, the polymer layer comprising an array of posts interspersed with recessed features, the pattern of photonic structure being disposed on top surfaces of the posts, and the anti-biofouling material disposed on the recessed features.

Embodiment 38 is the method of any one of embodiments 23-37, further comprising disposing a coating or polymer disposed on the analyte sites to bind an analyte binding material.

Embodiment 39 is the method of embodiment 38, wherein the analyte binding material is configured to bind biomolecules.

Embodiment 40 is the method of embodiment 39, wherein the analyte binding material comprises at least one of a DNA template, a primer, or an aptamer.

Embodiment 41 is the method of any one of embodiments 23-40, further comprising disposing an optically clear adhesive layer on the second major surface of the flexible carrier layer.

Embodiment 42 is the method of embodiment 41, further comprising disposing a release liner disposed on the optically clear adhesive layer.

Embodiment 43 is the method of embodiment 41 or 42, further comprising disposing a flow cell substrate on the optically clear adhesive layer.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

| Abbreviation | Description and Source |
|---|---|
| HOAc | Acetic acid from EMD Millipore, Billerica, MA |
| Acrylate Resin A | 75 wt % Photomer 6210 with 25 wt % SR238 and 0.5% TPO |
| Acrylate Resin D | 60 wt % Photomer 6210 with 20 wt % SR238, 20 wt % SR351 and 0.5% TPO |
| Alexa Fluor™ 488 NHS Ester | Alexa Fluor™ 488 NHS Ester (Succinimidyl Ester), ThermoFisher Scientific, Waltham, MA |
| Alexa Fluor™ 647 COOH | Alexa Fluor™ 647 Carboxylic Acid, tris(triethylammonium) salt, ThermoFisher Scientific, Waltham, MA |
| APTMS | 3-aminopropyltrimethoxysilane from Alfa Aesar, Ward Hill, MA |
| Coating Solution 1 | 0.25 wt % PVA in a 75/25 solution of IPA/H2O with 0.025% Tergitol 15-S-7 |
| Coating Solution 2 | 2.5 wt % PVB 30H in IPA with 0.3% Tergitol |
| Coating Solution 3 | 2.5 wt % PVB 30H in IPA |
| EtOH | Anhydrous ethanol from EMD Millipore, Burlington, MA |
| Fluoropolymer Solution 1 | 3 wt % THV221A in a 80/20 solution of MEK/MIBK |
| Potassium Phosphate Monobasic | VWR International LLC (Radnor, PA) |

-continued

| Abbreviation | Description and Source |
| --- | --- |
| Potassium Phophate Dibasic Trihydrate | Sigma Aldrich (St. Louis, MO) |
| PVA | 9,000-10,000 Molecular Weight, 80% hydrolized polyvinyl alcohol, Sigma-Aldrich Inc., St Louis, MO |
| PVB 30 H | Mohwitol ® Polyvinyl butyral 30H, Kuraray America Inc, Tokyo, Japan |
| Resolve ™ | Microscope Immersion Oil from Criterion Sciences under Cornwell Corp., Riverdale, NJ |
| Tergitol ™ | Tergitol ™ 15-S-7, Sigma-Aldrich Inc, St Louis, MO |
| Type F Immersion Liquid | Leica Microsystems, Wetzlar, Germany |
| IPA | Isopropyl Alcohol; Brenntag Great Lakes, Wauwatosa, WI |
| MEK | Methyl ethyl ketone; Brenntag Great Lakes, Wauwatosa, WI |
| MIBK | Methyl isobutyl ketone; Brenntag Great Lakes, Wauwatosa, WI |
| TE Buffer pH 8 | Invitrogen ™ TE Buffer pH 8 from Thermo Fisher Scientific, Vilnius, Lithuania |
| TPO | Diphenyl (2,4,6- trimethylbenzoyl)phosphine Oxide, IRGACURE TPO; BASF, Florham Park, NJ |
| THV221A | THV, Dyneon THV 221A; 3M Co, Saint Paul, MN |
| TTIP | Titanium(IV) iso-propoxide, min. 98%, Strem Chemicals, Newburyport, MA |
| N2 | Ultra High Purity Grade Nitrogen, 99.999%, Airgas, St. Paul, MN |
| N2O | Ultra High Purity Grade Nitrous Oxide, 99.99%, Airgas, St. Paul, MN |
| Ar | Ultra High Purity Grade Argon, 99.999%, Airgas, St. Paul, MN |
| O2 | Ultra High Purity Grade Oxygen, 99.994%, Airgas, St. Paul, MN |

Test Methods

Test Method 1: Confocal Microscopy Using Leica Stellaris 5 Microscope

The samples with green, fluorescent labels were imaged using a confocal microscope (Leica Stellaris 5 equipped with an HCX PL APO CS2 63×/1.4 Oil (FWD=0.14 mm) objective. The film samples were adhered on a 1 inch×3 inch microscope slide using a droplet of Resolve™ Microscope Immersion Oil (Cornwell Corp., Riverdale, NJ) and covered with a glass cover slip. A droplet of type F Immersion liquid (Leica Microsystems, Wetzlar, Germany) was applied onto the 63×/1.4 Oil objective prior to imaging. The fluorescent images were then taken using 488 laser excitation at 6-25% laser intensity. The scanning parameters were set to define a field of view of either 18.24 microns×18.24 microns or 43.92 microns×43.92 microns. The resulting confocal images were analyzed using the Leica Application Suite X (LAS X) software.

Test Method 2: Confocal Microscopy Using Zeiss Axioplan 2 Confocal Microscope with LSM 510 Laser Module Samples with red fluorescent labels were imaged using a confocal microscope (Zeiss Axioplan 2 with LSM 510 Laser Module, Zeiss, Thornwood N.J.) equipped with an Achroplan 63×/1.4 Oil DIC M27 (FWD=0.19 mm) objective. The film samples were adhered on a 1 in×3 in microscope slide using a droplet of Resolve™ Microscope Immersion Oil (Cornwell Corp., Riverdale, NJ) and covered with a glass cover slip, onto which another droplet of microscope oil was added. The fluorescent images were then taken using 633 nm laser excitation at 55-75% power and a 650 nm long pass filter. The scanning parameters were set to define a field of view of either 20.47 microns×20.47 microns. The resulting confocal images were analyzed using the ZEN 2009 software from Zeiss.

Test Method 3: SEM Imaging

Samples were mounted on Aluminum examination stubs and coated with AuPd by DC sputtering to ensure conductivity. Examinations were performed in a Hitachi S4700 Field Emission Scanning Electron Microscope.

PREPARATORY EXAMPLES

Preparatory Example 1

Resin D was prepared by combining and mixing PHOTOMER 6210, SR238, SR351 and TPO in weight ratios of 60/20/200.5.

Preparatory Example 2

A 0.1 M potassium phosphate buffer was first prepared by combining 38.5 g of 1 M $KH_2PO_4$ and 61.5 g of 1 M potassium phosphate dibasic trihydrate. Ten mM phosphate buffer with pH 7.0 was then prepared by mixing 10 g of the 0.1 M potassium phosphate buffer with 90 g of deionized water.

Preparatory Example 3

A randomly nanostructure silicon containing etch resist was deposited onto ST505 film using a parallel plate capacitively coupled plasma reactor as described in U.S. Pat. No. 6,696,157). The chamber has a central cylindrical powered electrode with a surface area of 1.7 m² (18.3 ft²). After placing the film on the powered electrode, the reactor chamber was pumped down to a base pressure of less than 1.3 Pa (2 mTorr). O2, and HMDSO gasses were flowed into the chamber at a rate 18 SCCM, and 750 SCCM respectively. Treatment was carried out using a plasma enhanced CVD method by coupling RF power into the reactor at a frequency of 13.56 MHz and an applied power of 7500 watts. Treatment time was controlled by moving the film through the reaction zone at rate of 17 ft/min, resulting in an approximate exposure time of 17 seconds.

After completing the deposition, RF power was turned off and gasses were evacuated from the reactor. Following the 1st treatment, a 2nd plasma treatment was carried out in the same reactor without returning the chamber to atmospheric pressure. TMS and $O_2$ gases were flowed into the chamber at approximately 500 SCCM and 2000 SCCM respectively. About 13.56 MHz RF power was subsequently coupled into the reactor with an applied power of 2000 W. The film was then carried through the reaction zone at a rate of 30 ft/min, resulting in an approximate exposure time of 10 seconds.

Following the 2nd treatment, a 3rd plasma treatment was carried out in the same reactor without returning the chamber to atmospheric pressure. $O_2$ gas was flowed into the chamber at approximately 2000 SCCM. 13.56 MHz RF power was subsequently coupled into the reactor with an applied power of 2000 W. The film was then carried through the reaction zone at a rate of 30 ft/min, resulting in an approximate exposure time of 10 seconds. At the end of this treatment time, the RF power and the gas supply were stopped and the chamber was returned to atmospheric pressure.

Simulation Method

Commercial electromagnetic solvers, including Finite Difference Time Domain (FDTD) simulations, Finite Element Method (FEM) and Rigorous Coupled Wave Analysis (RCWA) were used to explore multiple parameters of photonic structures, such as sizes, depths, shapes, pitches, lattice structures and so on, to find the optimum combinations for enhancing fluorescence signals. The computation domain was limited to one-unit cell of the photonic structure with periodic boundary conditions applied to surfaces along lateral dimensions. The top and bottom surfaces of the computation domain are enclosed by perfectly matched layer to absorb any stray light passing through the boundary so that no light will be scattered back to the computing region and disrupt the simulation. A fine mesh of size step of 5 to 10 nm was used on the photonic nanostructure region to ensure simulation accuracy. A broadband light source was injected into the model to simulate the reflection/transmission and electric field distribution. Based on different designs, a sweep of different parameters, for example, pitches, sizes, heights and shapes, was carried out to locate the right parameters for creating the resonances that align with the excitation/emission spectra of fluorophores.

Additionally, the emission distribution was simulated based on the reciprocity theorem, which states that the calculation of far-field emission power of light emitted by fluorophore is equivalent to calculating the absorption of light by fluorophores in response to external light excitation. Rigorous Coupled Mode Analysis (RCWA) was used to model the emission distribution. By adding loss to the region occupied by fluorophore labelled analytes in the photonic structures, for example, nanowells of the photonic crystal, the absorption of light at various wavelengths and incident angles was obtained with RCWA. The absorption distribution in the Fourier space (i.e. angular space) is equivalent to the far-field emission distribution.

Example 1

FIG. 7A illustrates an exemplary design of photonic crystal consisting of a two-dimensional hexagonal array of $TiO_2$ coated nanowells for Example 1. FIG. 7B shows its cross section. Photonic crystal design parameters were computationally searched to tune the resonances to target excitation or emission wavelengths of fluorophores located inside or near the nanowells. The above mentioned simulation method was used to explore multi-parameters, such as sizes, depths, shapes, pitches, lattice structures and so on, to find the optimum combinations for enhancing fluorescence signals. For example, a design targeted at Alexa 660 and Alexa 532 dyes was optimized using FDTD. The computation domain was limited to one-unit cell of the photonic crystal with a periodic boundary condition applied to surfaces along x- and y-directions. The top and bottom surfaces of the computation domain were enclosed by perfectly matched layer to absorb any stray light passing through the boundary so that no light will be scattered back to the computing region and disrupt the simulation. A mesh of size step of 5 nm was used on the photonic crystal region to ensure simulation accuracy. A broadband light source (400 to 800 nm) was injected into the model to simulate the reflection/transmission and electric field distribution. The superstrate is aqueous solution with a refractive index of 1.33. With a pitch of 400 nm and depth of 100 nm, the photonic crystal supports high quality-factor (that is the resonant frequency over width of the resonance) resonances at the wavelengths where the two different Alexa dyes are excited (e.g. $\lambda=532$ nm for Alexa 532 and $\lambda=660$ nm for Alexa 660). The thickness of high index $TiO_2$ was used to fine-tune the spectral location of the resonant modes.

Figure 7C:
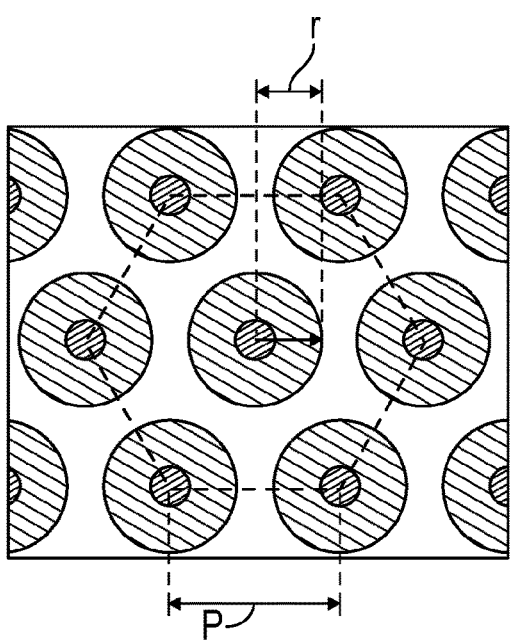
FIG. 7C is simulated reflectance spectra of the photonic crystal for Example 1.
Figure 7C:
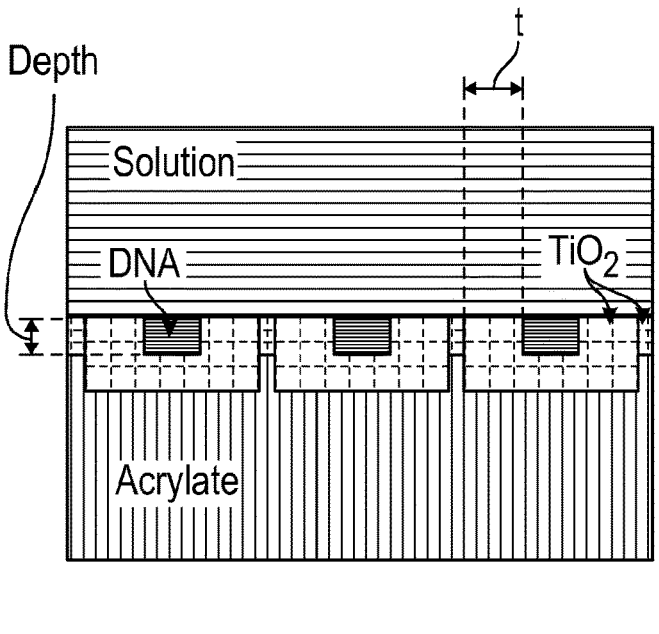
Figure 7C:
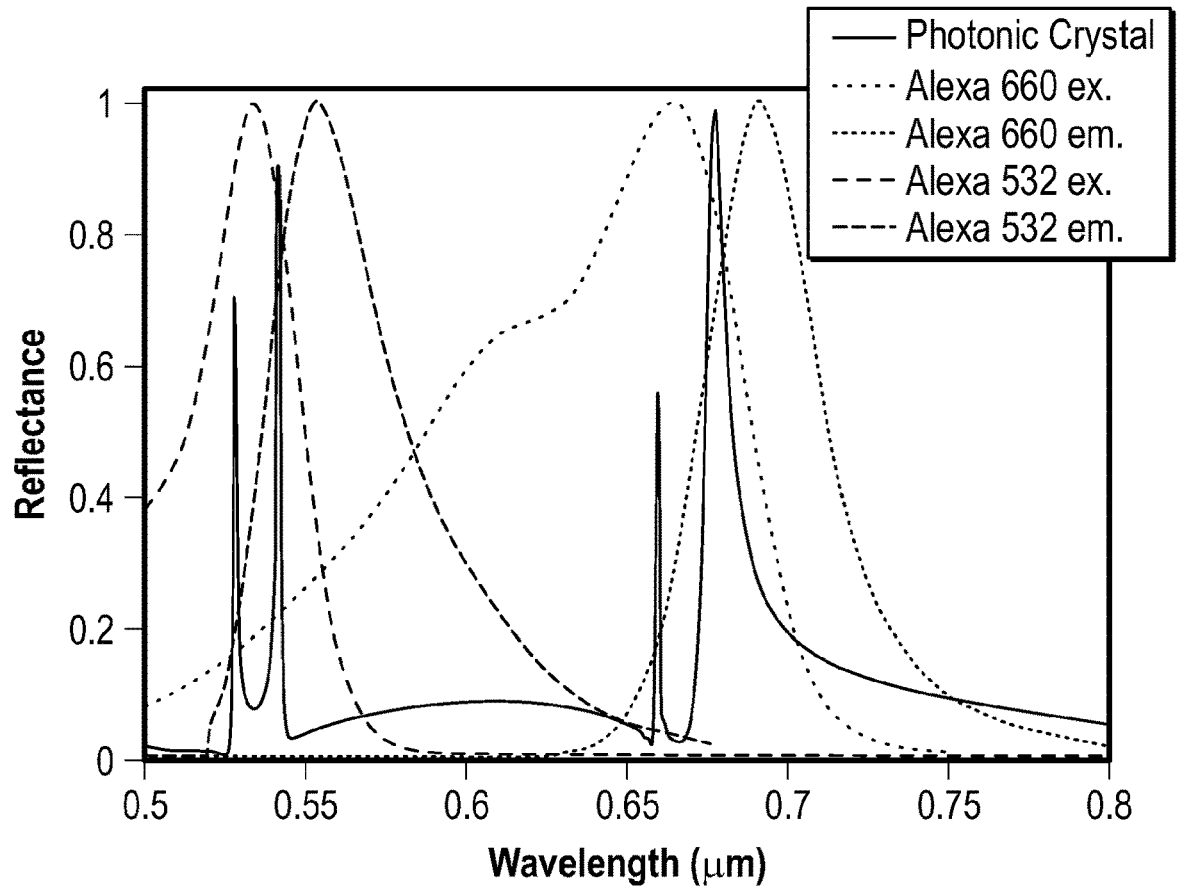
Figure 7D:
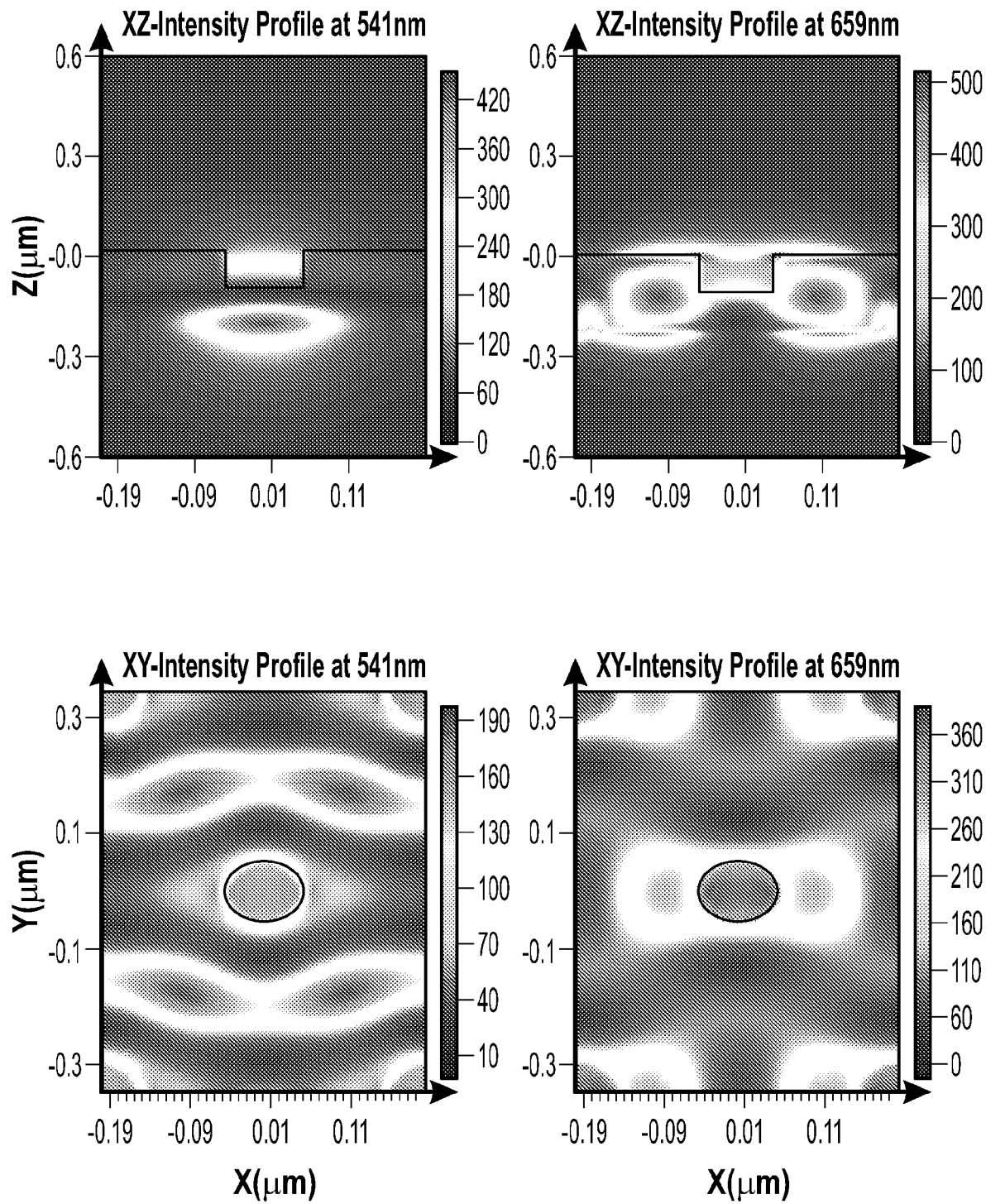
FIG. 7D is simulated XZ and XY electric field intensity profiles at two excitation wavelengths for Example 1.

FIG. 7C shows the simulated electric field intensity (normalized to the unit amplitude incident field) at two excitation wavelengths. It is overlaid with the excitation and emission spectra of two different Alexa fluorophores to show the spectral overlap between the GMRs of PhC and the excitation/emission spectra. The resonant effect is manifested as the enhanced intensity inside the nanowells. The intensity distribution is uniform inside the wells, which is beneficial to get uniform and consistent fluorescence signal boosting. The excitation enhancement factors estimated from the intensity distribution is around 200 for Alexa 532 and 350 for Alexa 660.

Figure 8A:
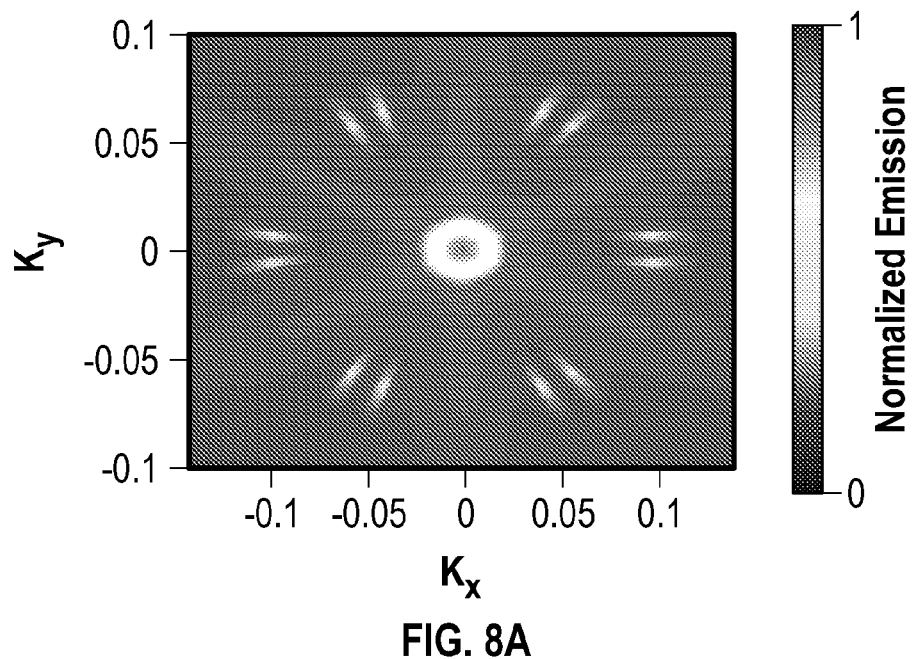
FIG. 8A is the Fourier Space image (or back focal plane image) of the fluorescence emission distribution for Example 1.
Figure 8B:
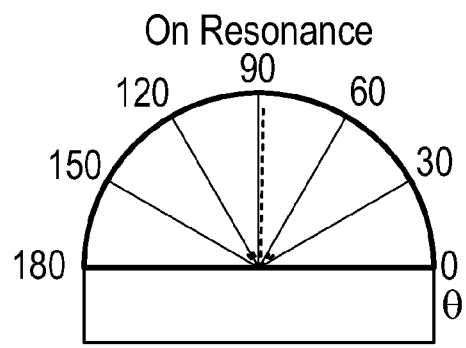
FIG. 8B is the upper half-space emission pattern cross-section for ky=0 when the emission wavelength aligns with the GMR.
Figure 8C:
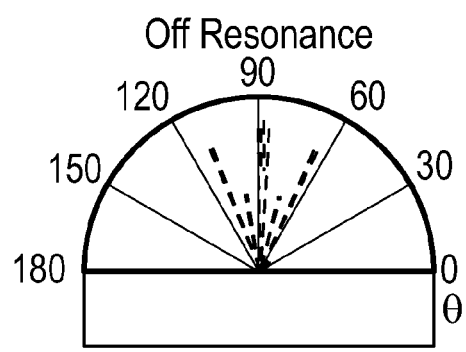
FIG. 8C is the upper half-space emission pattern cross-section for ky=0 when the emission wavelength does not align with the GMR.

Besides the excitation field enhancement, the photonic crystal of Example 1 can also control the fluorescence emission directionalities to enable efficient collection of fluorescent signals. Rigorous Coupled Mode Analysis (RCWA) was used to model the far field fluorescence emission. FIG. 8A illustrates the Fourier Space image of the emission distribution, where a bright spot was located at the center, indicating that most of the emitted light is confined inside a small polar angular range. This is further illustrated by the upper-half space emission pattern (FIG. 8B), which features a highly directional lobe normal to the substrate. In contrast, the emission under off-resonance condition shows multiple sidelobes at large angles (FIG. 8C). This highly direction emission facilitates the collection of fluorescence with an objective of limited numerical aperture.

Example 2

Figure 9A:
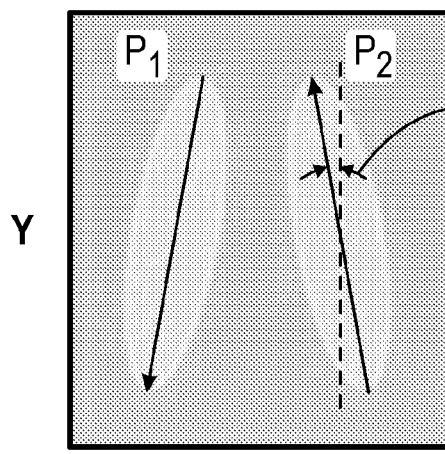
FIG. 9A is a schematic top view of a luminescent imaging film for Example 2.
Figure 9B:
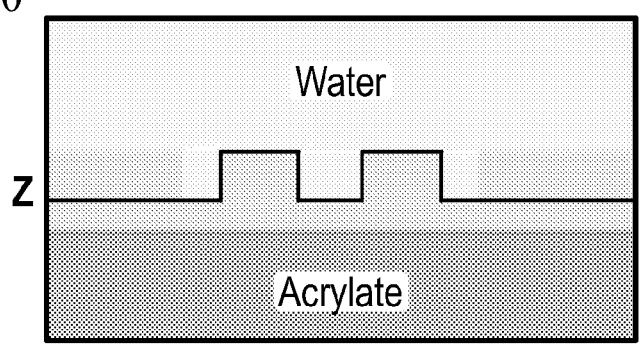
FIG. 9B is a schematic cross-sectional view of the luminescent imaging film for Example 2.
Figure 9C:
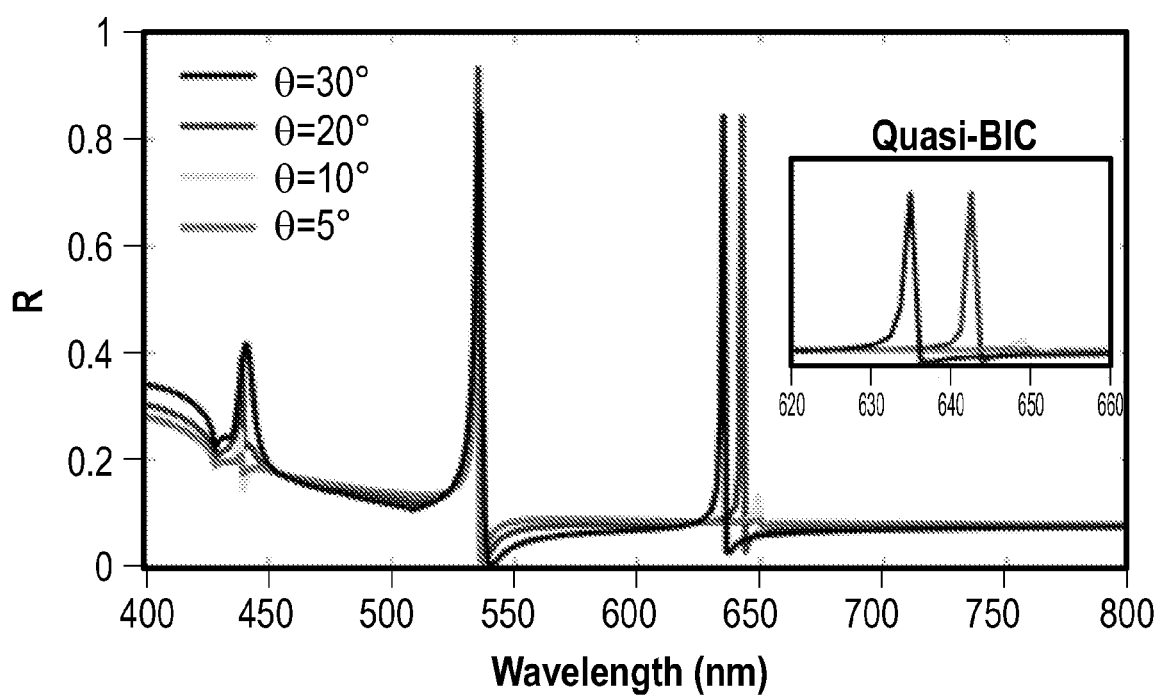
FIG. 9C is simulated reflectance spectra for Example 2 at different rotation angles.

Additionally, asymmetric metamaterial designs achieve high quality factor resonances at quasi bound state in the continuum (BIC) mode. Example 2 has a design of photonic structure including rotated ellipses pair as shown in FIG. 9A. The in-plane symmetry is broken by the rotating of ellipses. To gain a deeper insight into the physics of quasi-BIC in the asymmetric ellipses pair design (e.g., made of TiO 2), it can be treated as a zig-zag array of dipoles polarized along the long axis of each individual ellipse. When excited by a light polarized along x axis, the induced dipole moment on ellipses pair is antiparallel (FIG. 9A) and dominantly aligns with the y axis. For a lossless system, the quality factor of the resonance is determined by the radiative loss, which relies on the overlapping of the mode profile and the polarization of the scattering channel Because p1y=−p2y, the out-coupling with the plane wave of Ey polarization is cancelled. The overall scattering loss is determined by px, which can be tuned by the tilting angle and vanishes as the angle goes to zero. For example, FIG. 9B shows that by reducing the rotation angle, the resonant feature around 640 nm becomes sharper and finally disappears at small angles.

Figure 10A:
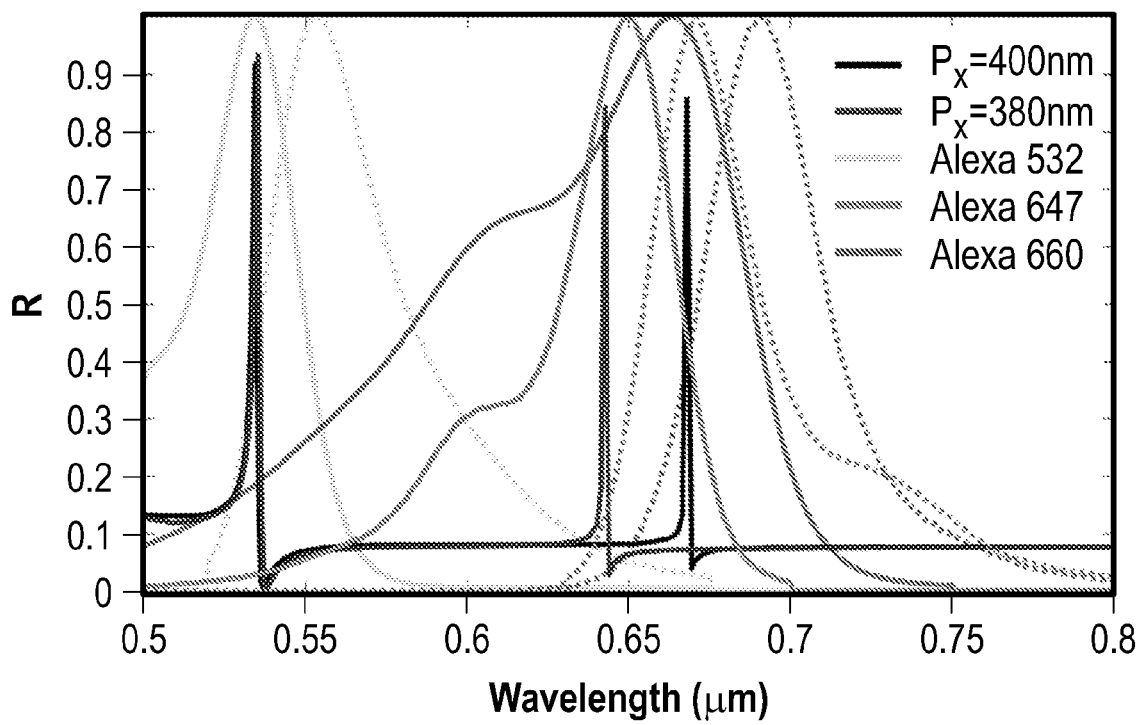
FIG. 10A is simulated reflectance spectra for Example 2 with different pitches along the x-axis direction.
Figure 10B:
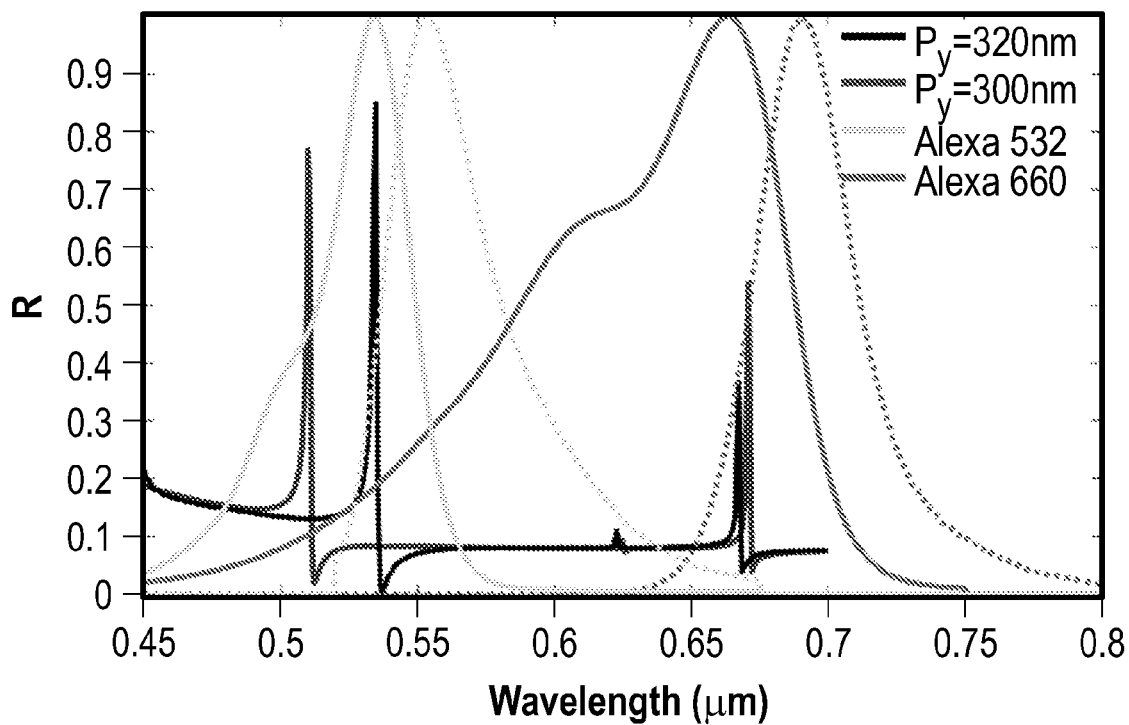
FIG. 10B is simulated reflectance spectra for Example 2 with different pitches along the y-axis direction.
Figure 10C:
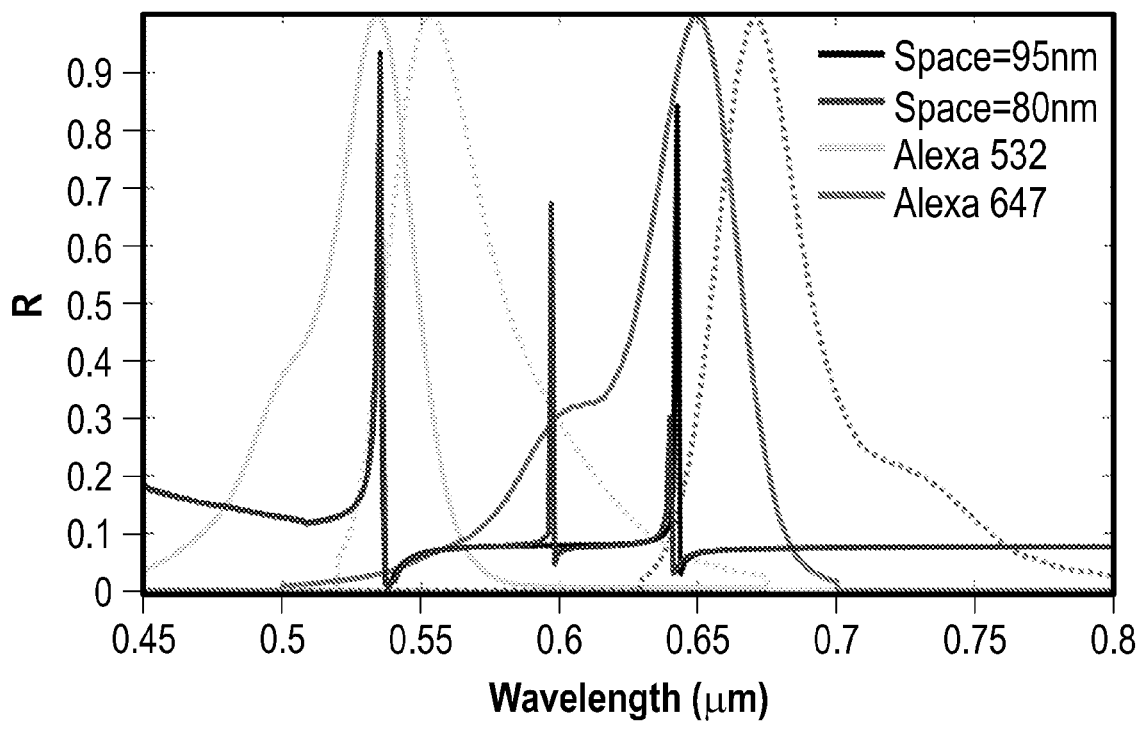
FIG. 10C is simulated reflectance spectra for Example 2 with different spacing between two ellipses.
Figure 10D:
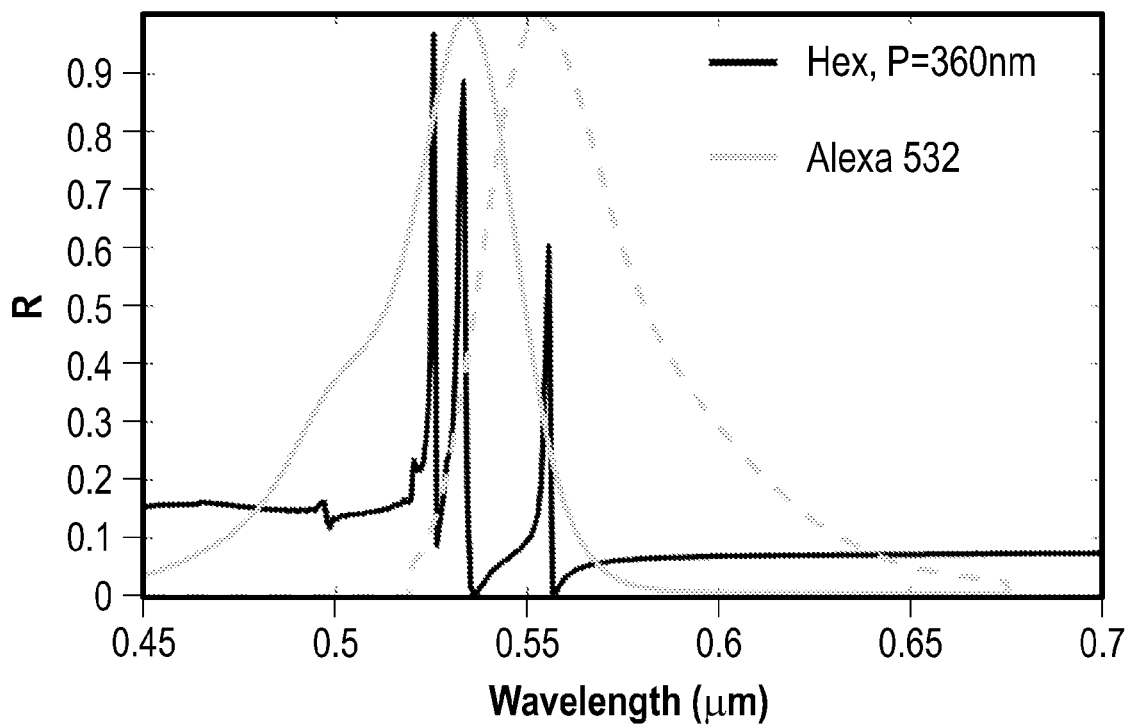
FIG. 10D is simulated reflectance spectra for Example 2 in a hexagonal lattice.

By tuning the geometrical parameters, the resonant modes of the design can be tuned to the excitation wavelengths of different fluorophores. By arranging the unit cell in a rectangular array, pitches along x direction (Px) and y direction (Py) are independent tuning knobs for tuning the resonances at the long and short wavelengths. For example, FIG. 10A shows that decreasing Px shifts the long wavelength resonance from 660 nm to 640 nm, but it has no impact on the short wavelength resonance. And FIG. 10B shows that tuning Py only changes the position of the short wavelength resonance. In addition, decreasing the separation of the ellipses pair can generate new resonance (FIG. 10C), which helps enhance multiple different fluorophores. In addition, FIG. 10D illustrates a design with hexagonal lattice structure. The resonances wavelengths align with the excitation and emission of spectra of Alexa 532.

Figure 11:
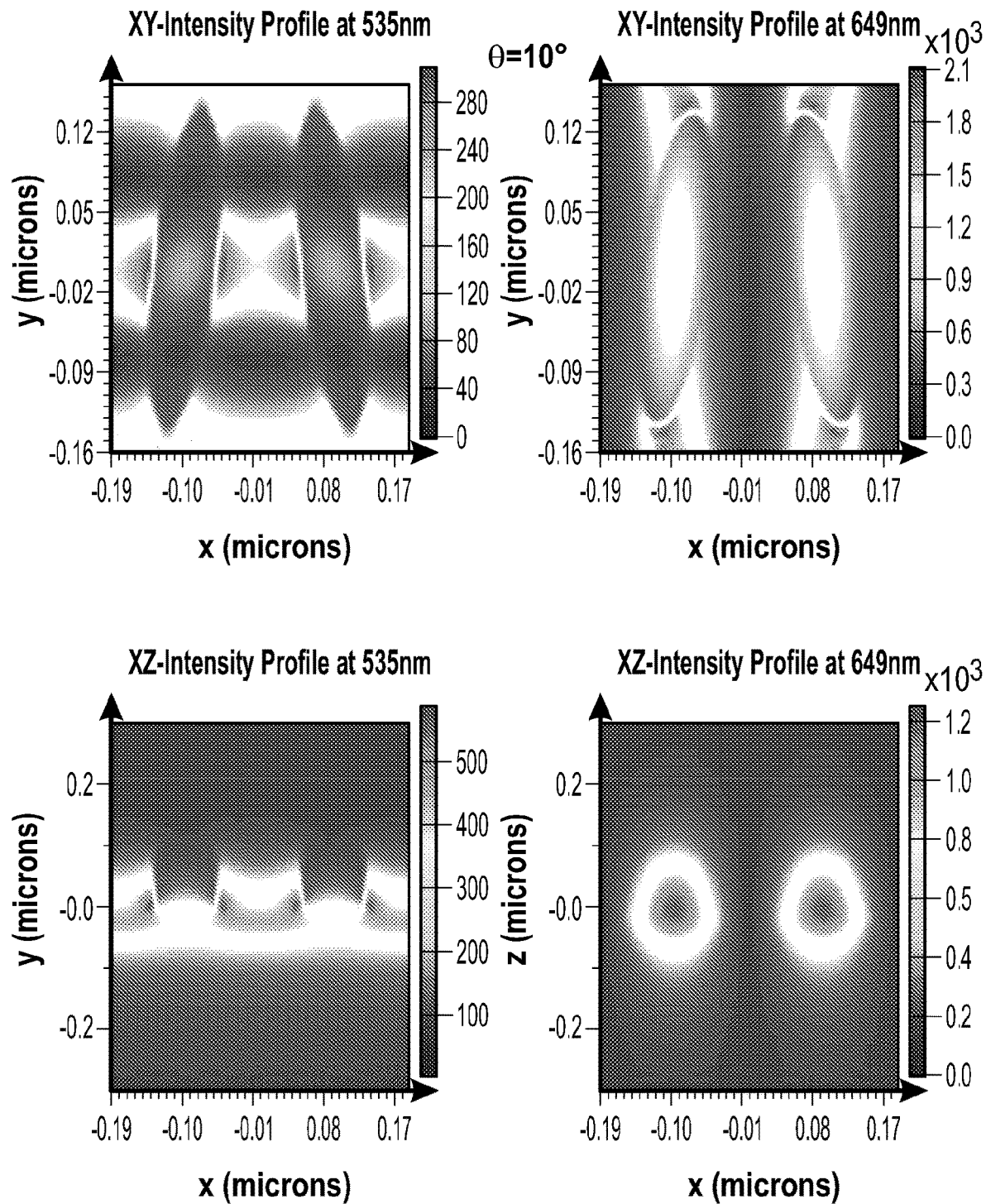
FIG. 11 is simulated XZ and XY electric field intensity profiles at two excitation wavelengths for Example 2.
Figure 12A:
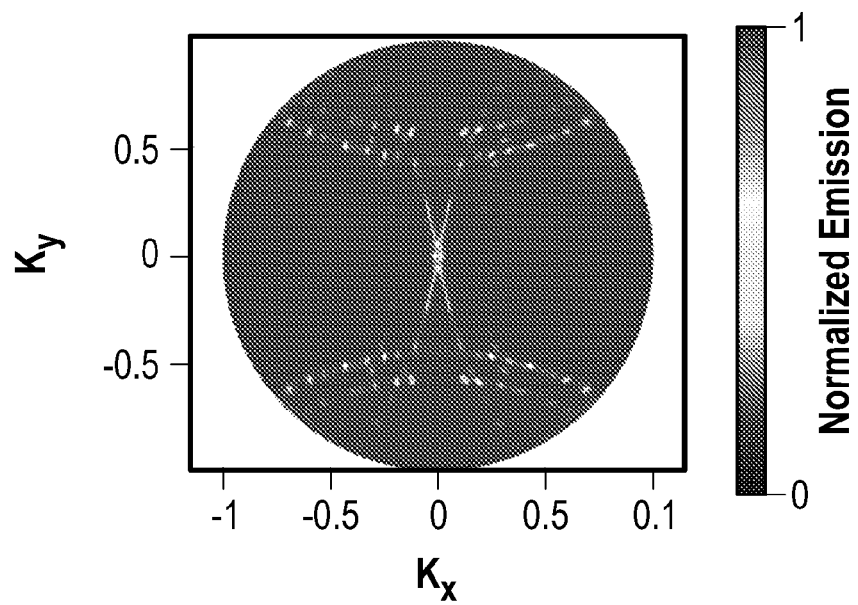
FIG. 12A is a Fourier Space image (or back focal plane image) of the fluorescence emission distribution for Example 2.
Figure 12B:
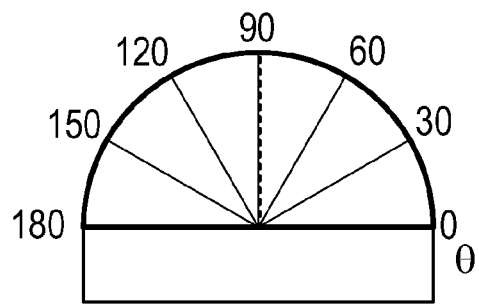
FIG. 12B is the upper half-space emission pattern cross-section for ky=0 when the emission wavelength aligns with the quasi-BIC resonance.

FIG. 11 illustrates the electric field intensity enhancement distribution of a unit-cell with different rotation angle θ=10°. This asymmetric design allows stronger near-field enhancement near the surface of the nanostructure, which is a desirable for fluorescence enhancement. At the excitation wavelength for red fluorophore, the local electric field intensity is confined to the two ends of the ellipses. The intensity enhancement is on the order of 1000. Using the same method as described in EXAMPLE 1, the emission distribution of fluorescence on the asymmetric metamaterial was simulated and shown in FIG. 12A. The Fourier Space image shows that the radiation pattern of a quasi-BIC mode (λ=695 nm) preserves the near field polarization feature of the asymmetric ellipses pair. FIG. 12B shows directional emission along the normal direction.

Example 3

Figure 13A:
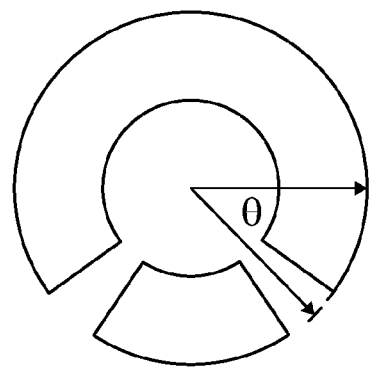
FIG. 13A is a schematic top view of a luminescent imaging film for Example 3.
Figure 13B:
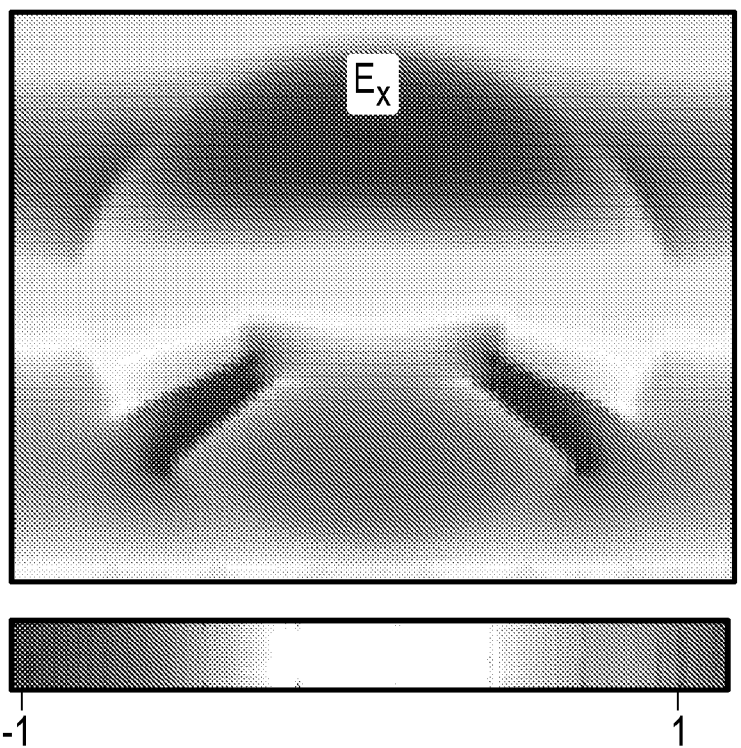
FIG. 13B is an electric field distribution for Example 3.
Figure 13C:
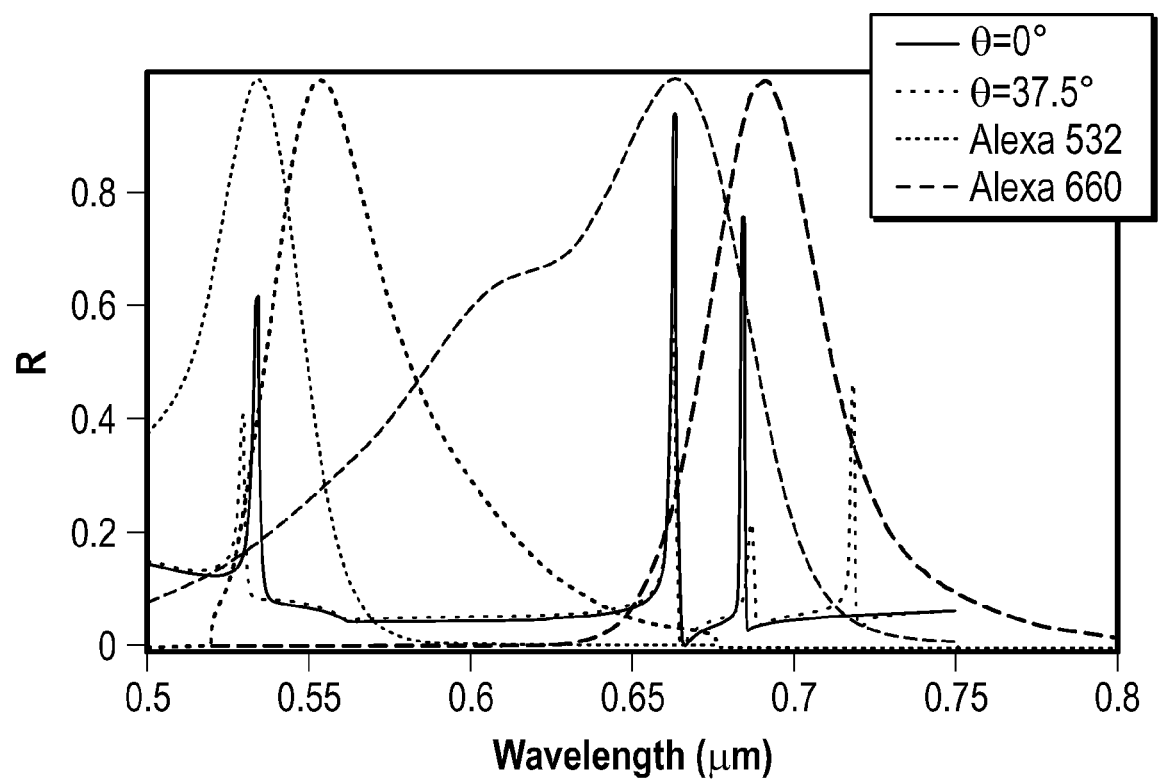
FIG. 13C is simulated reflectance spectra for Example 3 with different angular position of the slit.
Figures 1, 13D:
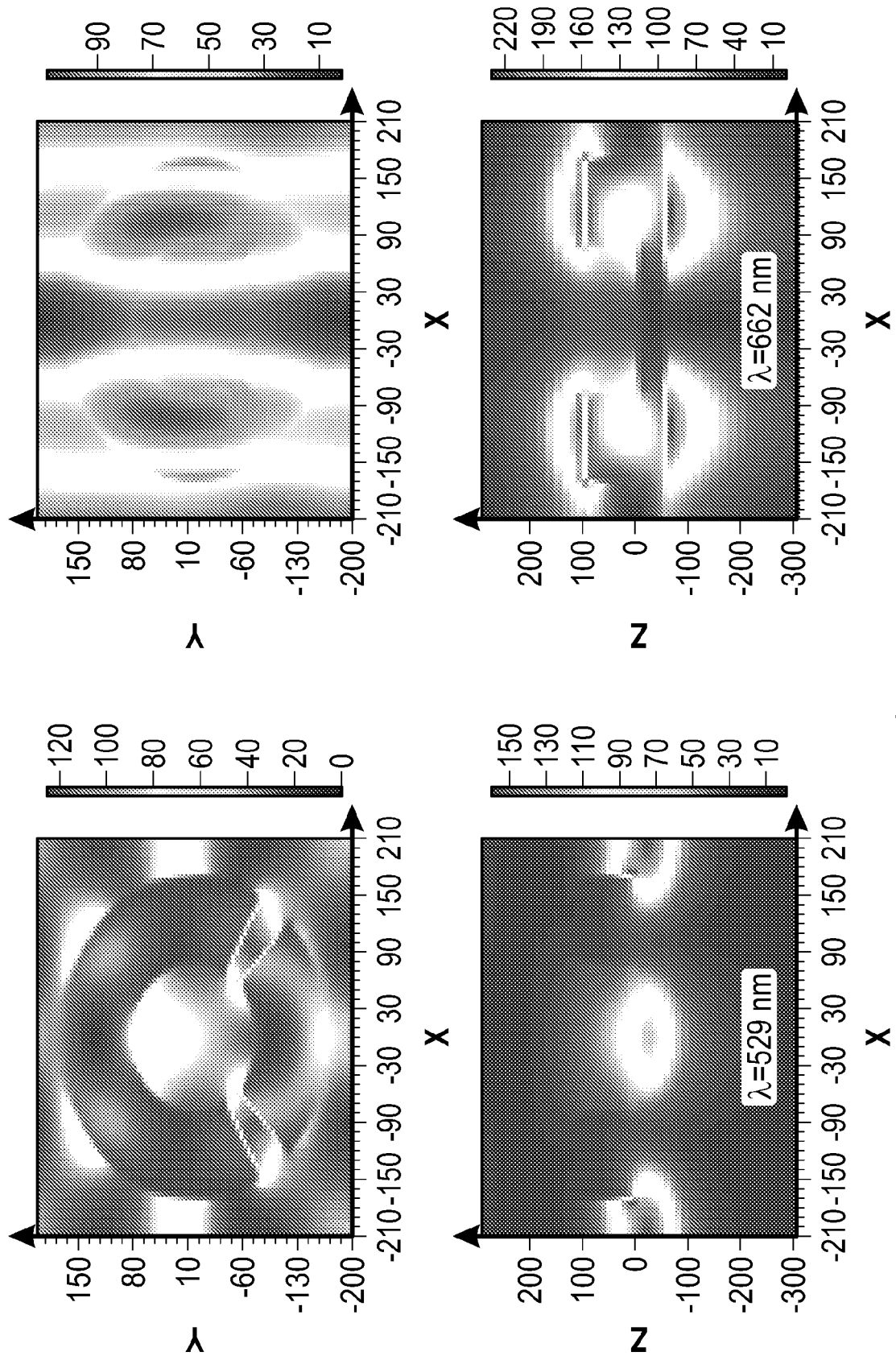
FIG. 13D is simulated x-z and x-y electric field intensity profiles at two excitation wavelengths for Example 3.
Figures 2, 13D:
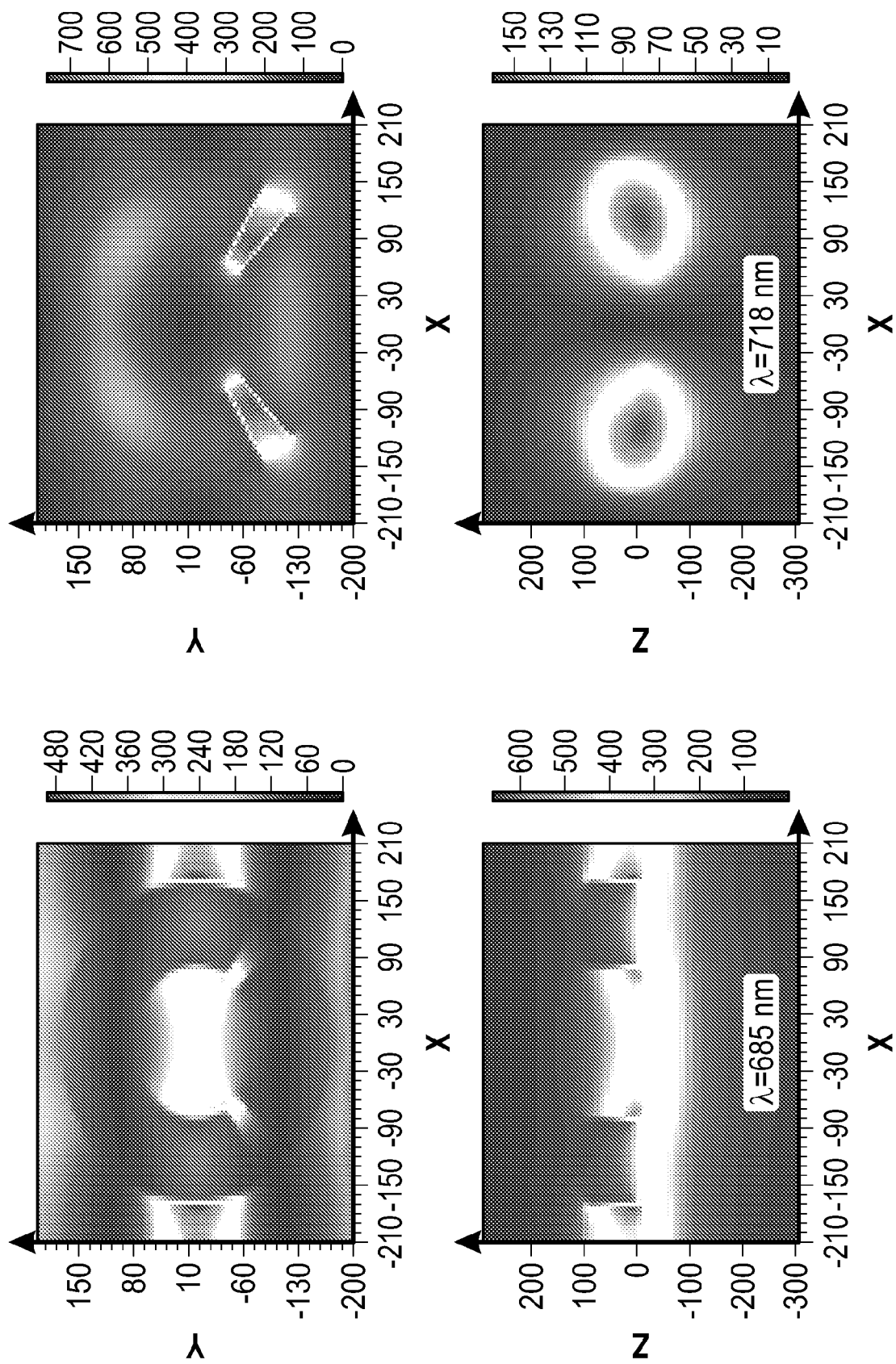

The photonic structure of Example 3 includes a split ring resonator that shows high-quality factor resonance due to the spatial symmetry breaking. As shown in FIG. 13A, the nano-ring has two equal splits dividing it to a pair of arcs of different lengths. The reflectance spectra were presented in FIG. 13C. Compared with the symmetric design (θ=0), the asymmetric split ring resonator showed a prominent peak around 718 nm. This quasi-BIC mode is inaccessible in symmetrically split rings and is weakly coupled to free space, hence the strong field confinement and high-quality factor. The electric field distribution showed an antisymmetric mode, as shown in FIG. 13B, two parts of the ring were excited in antiphase, while the field amplitudes were almost the same. The scattered light by such a resonant mode is very weak, which dramatically reduces the coupling to free space. The asymmetric split ring shows multiple resonance modes for enhancing Alexa 532 and Alexa 660, and the intensity distribution for the quasi-BIC mode (λ=718 nm) exhibits the strongest enhancement factor of 700.

Example 4

Step 1: A nano-featured template film was prepared by die coating Resin D onto a polycarbonate film. The coated film was pressed against a nanostructured nickel surface attached to a steel roller controlled at 60° C. using a rubber covered roller at a speed of 15.2 meters/min. The nanostructured nickel tool consists of a 1.5 mm by 1.5 mm patterned area with a hexagonal hole array. The holes are 360 nm in diameter, 100 nm deep, and have a pitch of 430 nm with side wall angles of approximately 4 degrees. The coating thickness of Resin D on the film was sufficient to fully wet the nickel surface and form a rolling bead of resin as the coated film was pressed against the nanostructured nickel surface. The film was exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the film was exposed again to radiation from the Fusion UV lamp system.

Step 2: A silicon containing release film layer assembled according to methods described in U.S. Pat. No. 6,696,157 (David et al.) and U.S. Pat. No. 8,664,323 (Iyer et al.) and U.S. Patent Publication No. 2013/0229378 (Iyer et al.) was applied to the nanostructure tooling film in a parallel plate capacitively coupled plasma reactor. The chamber has a central cylindrical powered electrode with a surface area of 1.7 m$^2$ (18.3 ft$^2$). After placing the nanostructured tooling film on the powered electrode, the reactor chamber was pumped down to a base pressure of less than 1.3 Pa (2 mTorr). O2 gas was flowed into the chamber at a rate of 1000 SCCM. Treatment was carried out using a plasma enhanced CVD method by coupling RF power into the reactor at a frequency of 13.56 MHz and an applied power of 2000 watts. Treatment time was controlled by moving the nanostructured tooling film through the reaction zone at rate of 9.1 meter/min (30 ft/min) resulting in an approximate exposure time of 10 seconds. After completing the deposition, RF power was turned off and gasses were evacuated from the reactor. Following the 1st treatment, a 2nd plasma treatment was carried out in the same reactor without returning the chamber to atmospheric pressure. HMDSO gas was flowed into the chamber at approximately 1750 SCCM to achieve a pressure of 9 mTorr. 13.56 MHz RF power was subsequently coupled into the reactor with an applied power of 1000 W. The film was then carried through the reaction zone at a rate of 9.1 meter/min (30 ft/min) resulting in an approximate exposure time of 10 seconds. At the end of this treatment time, the RF power and the gas supply were stopped, and the chamber was returned to atmospheric pressure.

Step 3: Acrylate Resin A was dispensed on the HMDSO-treated patterned film with a syringe pump and a sheet of ST505 was laminated over the top such that the entire patterned area was covered with Acrylate Resin A. Acrylate Resin A was then cured while using a D bulb at room temperature, 20° C. Then the ST505 layer was peeled from the release-treated-nanostructure film. Acrylate Resin A was peeled off the release-treated tooling film, leaving an inverted nanostructure film on the ST505.

Step 4: The inverted film, ST505 with replicated Acrylate Resin A, was coated with 100 nm of TiO2. TiO2 films were deposited in a vacuum coating system similar to that as described in U.S. Pat. No. 20190112711A1 (Lyons et al). This system was threaded up with a substrate in the form of an indefinite length roll of PET substrate. The system was then pumped down to a pressure of less than 10 mtorr. The PET substrate was then dried by adding 4 SLMs of N2 to increase the pressure to about 100 mtorr, and advancing the substrate at a line speed of 3 m/min, heating the substrate with infrared lamps to 65° C. before entering the deposition zone, and translated through the deposition chamber heated to 65° C. The deposition chamber was then heated to 100° C. prior to starting the deposition process. During the deposition process, the substrate was advanced at a line speed of 3 m/min for 25 passes through the system. The deposited thickness per pass is expected to be independent of the line speed, per previous experiments and expected growth properties of atomic layer deposition processes. TTIP, loaded into a precursor bubbler source(s) enclosed in a heating jacket was heated to 80° C., and N2 push gas was introduced at 300 sccm per source. The precursor delivery line connecting the heated source to the first and second zones was heated to 90° C. The TTIP was continuously delivered from two separate sources into the first and second zones of the system. N2O and N2 process gas was introduced into, and split between, the fourth and fifth zones at flow rates of 4 and 15 SLM, respectively. 2.5 SLM N2 was introduced outside of the deposition zone (sealing gas), with the total pressure inside the system about 1.4 torr. The plasma array was ignited and controlled to a power of 10 kW (AC, current density=0.6 mA/cm2). The mixture of the reactive species, process gas, and precursor was removed from the first zone and the second zone with balanced draw. The web was translated through the deposition chamber forward and backward to reach the targeted thickness.

Example 5

Step 1: A nano-featured template film was made according to step 1 of Example 4 using a nanostructured nickel tool consisting of a 1.5 mm by 1.5 mm patterned area with a hexagonal hole array. The holes are 320 nm in diameter, 100 nm deep, and have a pitch of 400 nm with side wall angles of approximately 4 degrees.

Step 2: A photonic structure was made using the nano-featured template film from step 1 according to the methods described in Example 4.

Example 6

Step 1: Photonic structure features were prepared as described in Example 4.

Step 2: Fluoropolymer Solution 1 was die coated in a roll-to-roll process onto the substrate from step 1 with a slot die at a rate of 0.0508 m/s. The solution was coated 15.24 cm wide and pumped with a Harvard syringe pump at a rate of 2.7 sccm. The coating was dried at 65° C. for 2 minutes.

Step 3: Coating Solution 1 was die coated in a roll-to-roll process onto the film from step 2 at a rate of 0.05 m/s using a slot die. The solution was coated 15.24 cm wide and pumped with a Harvard syringe pump at a rate of 6.6 sccm. The coating was dried at 65° C. for 2 minutes.

Step 4: A second release treated tooling film was made following the same process as Steps 1 and 2 in example 4, except with a different nanostructured nickel tool. The nanostructured nickel tool used in this step consists of a 90 mm×90 mm square of 275 nm diameter wells at a pitch of 600 nm. The features were about 250 nm deep and had side wall angles of approximately 2 degrees.

Step 5: The release treated template film created in Step 4 was slot-die coated with a solution of Coating solution 3 at 0.05 meters per second. The solution was coated 15.24 cm wide and pumped with a Harvard syringe pump at a rate of 4.1 sccm. The coating was dried in a gap drier 1 m after coating. The film entered a nip 14 meters thereafter. At the nip, the film with the silicon containing layer and the fluorinated layer was laminated with the overcoated release treated template film. The nip consisted of a 90-durometer rubber roll and a steel roll set at 65° C. The nip was engaged by two Bimba air cylinders pressed by 0.55 MPa. The Coating Solution 2 was separated from the release treated template film remaining on the silicon and fluorine containing film for the entirety of the 90 mm by 90 mm patterned areas to create a masked nano-featured film. Web tensions were set to be approximately 0.0057 N/mm Step 6: Following the low-land transfer process, reactive ion etching was carried out on the patterned film in the same home-built reactor chamber used to deposit the PECVD release layer described in Step 2 of Example 4. After placing the coated film on the powered electrode, the reactor chamber was pumped down to a base pressure of less than 1.3 Pa (1 mTorr). O2 gas was flowed into the chamber at a rate of 1000 SCCM. 13.56 MHz RF power was subsequently coupled into the reactor with an applied power of 4000 W. The film was then carried through the reaction zone at a rate of 10 ft/min, to achieve an exposure time of approximately 30 sec in order to transfer the pattern into the fluoropolymer layer. After completing the 1st etch step, RF power was turned off and gasses were evacuated from the reactor and the chamber was returned to atmospheric pressure.

Figure 14:
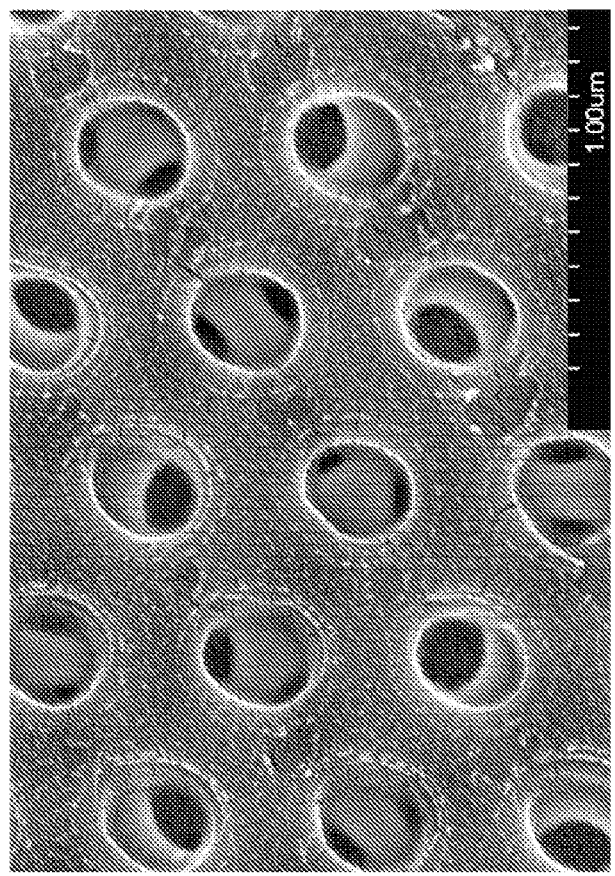
FIG. 14 is an SEM image of Example 6.

Step 7: The etched layers of Coating solution 3 and Coating Solution 1 were peeled off the Fluoropolymer Solution 2 layer. Acrylate Resin A was dispensed on the etched pattern film with a syringe and a sheet of roughed ST505 was laminated over the top such that the entire patterned area was covered with Acrylate Resin A. Acrylate Resin A was then cured while using a D bulb at room temperature, 20° C. Then the ST505 layer was peeled from the etched nanostructure film. The Coating solution 3 and Coating Solution 1 layers peeled off the etched nanostructure film, leaving a fluoropolymer layer with 275 nm wells where the bottom of the wells is the TiO2 coated photonic structure. FIG. 14 shows this structure imaged with a scanning electron microscope (SEM) according to Test Method 3. The SEM shows a top layer of 275 nm hexagonal holes with a 600 nm pitch on top of a lower structure of 360 nm hexagonal holes on a 430 nm pitch.

Example 7

Step 1: A nano-featured template film was prepared by die coating Resin D onto a polycarbonate film. The coated film was pressed against a nanostructured nickel surface attached to a steel roller controlled at 60° C. using a rubber covered roller at a speed of 15.2 meters/min. The nanostructured nickel tool consists a 1.5 mm by 1.5 mm patterned area with rotated ellipse pairs as shown in FIG. 9A. Each pair has a unit cell size of 320 nm by 400 nm. The major axis of the ellipse is 280 nm and the minor axis is 80 nm. The pair is separated by 200 nm along the major axis and they are angled at 10 degree and −10 degrees along their major axes. The features are 100 nm tall and had side wall angles of approximately 4 degrees. The coating thickness of Resin D on the film was sufficient to fully wet the nickel surface and form a rolling bead of resin as the coated film was pressed against the nanostructured nickel surface. The film was exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the film was exposed again to radiation from the Fusion UV lamp system.

Step 2: A silicon containing release film layer assembled according to methods described in U.S. Pat. No. 6,696,157 (David et al.) and U.S. Pat. No. 8,664,323 (Iyer et al.) and U.S. Patent Publication No. 2013/0229378 (Iyer et al.) was applied to the nanostructure tooling film in a parallel plate capacitively coupled plasma reactor. The chamber has a central cylindrical powered electrode with a surface area of 1.7 m$^2$ (18.3 ft$^2$). After placing the nanostructured tooling film on the powered electrode, the reactor chamber was pumped down to a base pressure of less than 1.3 Pa (2 mTorr). O2 gas was flowed into the chamber at a rate of 1000 SCCM. Treatment was carried out using a plasma enhanced CVD method by coupling RF power into the reactor at a frequency of 13.56 MHz and an applied power of 2000 watts. Treatment time was controlled by moving the nanostructured tooling film through the reaction zone at rate of 9.1 meter/min (30 ft/min) resulting in an approximate exposure time of 10 seconds. After completing the deposition, RF power was turned off and gasses were evacuated from the reactor. Following the 1st treatment, a 2nd plasma treatment was carried out in the same reactor without returning the chamber to atmospheric pressure. HMDSO gas was flowed into the chamber at approximately 1750 SCCM to achieve a pressure of 9 mTorr. 13.56 MHz RF power was subsequently coupled into the reactor with an applied power of 1000 W. The film was then carried through the reaction zone at a rate of 9.1 meter/min (30 ft/min) resulting in an approximate exposure time of 10 seconds. At the end of this treatment time, the RF power and the gas supply were stopped, and the chamber was returned to atmospheric pressure.

Step 3: Coating Solution 1 was die coated in a roll-to-roll process onto ST505 at a rate of 0.05 m/s using a slot die. The solution was coated 15.24 cm wide and pumped with a Harvard syringe pump at a rate of 6.6 sccm. The coating was dried at 65° C. for 2 minutes.

Step 4: The film from step 3 was corona treated according to the methods described in U.S. Pat. No. 7,442,442 B2. This was done at 0.05 m/s with settings targeting a dose of 1000 mJ/cm^2.

Step 5: The release treated template film created in Step 2 was slot-die coated with a solution of Coating Solution 2 at 0.0381 meters per second. The solution was coated 15.24 cm wide and pumped with a Harvard syringe pump at a rate of 5.25 sccm. The coating was dried in a gap drier 1 m after coating. The film entered a nip 14 meters thereafter. At the nip, the film from step 4 was laminated with the overcoated release treated template film. The nip consisted of a 90-durometer rubber roll and a steel roll set at 65° C. The nip was engaged by two Bimba air cylinders pressed by 0.55 MPa. The Coating Solution 2 was separated from the release treated template film remaining on the silicon and fluorine containing film for the entirety of the patterned areas to create a nano-featured film. Web tensions were set to be approximately 0.0057 N/mm.

Prophetic Example 8

Step 1: Example 7 is coated with TiO2 according to the process described in step 4 of Example 4. The coating conditions are adjusted for the desired thickness.

Step 2: The TiO2 layer and Coating Solution 2 layer are peeled off the Coating Solution 1 layer. Acrylate Resin A is dispensed on the etched pattern film with a syringe pump and a sheet of roughed ST505 is laminated over the top such that the patterned area is covered with Acrylate Resin A. The roughed ST505 is prepared according to the method described in Preparatory Example 3. Acrylate Resin A is then be cured while using a D bulb at room temperature, 20° C. Then the ST505 layer is peeled from the etched nanostructure film. The TiO2 and Coating Solution 2 layers are peeled off the layer of Coating Solution 1 leaving nano patterned TiO2 posts covered by Coating Solution 2.

Step 3: Coating Solution 2 is removed, leaving the nanopatterned TiO2 posts exposed. The layer of Coating Solution 2 is removed by plasma etching similar to what is described in Step 6 of Example 6 with conditions chosen for the properties of coating solution 2.

Step 4: A well pattern is created on top of the photonic structures made in Step 3 using the method described in Example 6. The bottoms of the 275 nm well features are exposed nanopatterned TiO2 posts and the top surface in between the wells is a fluoropolymer layer.

Example 9

Step 1: A nano-featured template film was prepared by die coating Resin D onto a polycarbonate film. The coated film was pressed against a nanostructured nickel surface attached to a steel roller controlled at 60° C. using a rubber covered roller at a speed of 15.2 meters/min. The nanostructured nickel tool consists of one 65 mm by 65 mm patterned area with features that are 200 nm in diameter and 310 nm tall with a pitch of 400 nm in a square array. The features had side wall angles of approximately 4 degrees. The coating thickness of Resin D on the film was sufficient to fully wet the nickel surface and form a rolling bead of resin as the coated film was pressed against the nanostructured nickel surface. The film was exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the film was exposed again to radiation from the Fusion UV lamp system.

Step 2: Example 9 sample was prepared on a vacuum coating system similar to that described in U.S. Pat. No. 20190112711A1 (Lyons et al). This system was threaded with a substrate in the form of an indefinite length roll of PET substrate. The system was then pumped down to a pressure of less than 10 mtorr. 4 SLMs of $N_2$ was then introduced to the system to increase the pressure to about 100 mtorr, and the substrate was advanced at a constant line speed of 3 m/min, heated with infrared lamps to 60° C., and translated through the deposition chamber heated to 60° C. to dry the substrate prior to the deposition process. The deposition chamber was then heated to 100° C. prior to starting the deposition process. During the deposition process, the substrate was advanced at a constant line speed at 1.5 m/min. TTIP, loaded into a precursor bubbler source(s) enclosed in a heating jacket was heated to 80° C., and $N_2$ push gas was introduced at 300 sccm per source. The precursor delivery line connecting the heated source to the first and second zones was heated to 90° C. The TTIP was continuously delivered into the first and the second zones of the system. $N_2O$ and $N_2$ process gas was introduced into, and split between, the fourth and fifth zones at flow rates of 3 and 10 SLM. 2.0 SLM $N_2$ was introduced outside of the deposition zone, with the total pressure inside the system about 1.0 torr. The plasma array was ignited and controlled at a power of 10 kW (AC, current density=0.3 mA/cm2). The mixture of the reactive species, process gas, and precursor was removed from the fourth zone and the fifth zone with balanced draw. The web was translated through the deposition chamber forward and backward to reach the targeted thickness.

Example 10

Step 1: A nano-featured template film was prepared by die coating Resin D onto a polycarbonate film. The coated film was pressed against a nanostructured nickel surface attached to a steel roller controlled at 60° C. using a rubber covered roller at a speed of 15.2 meters/min. The nanostructured nickel tool consists of one 65 mm by 65 mm patterned area with features that are 200 nm in diameter and 310 nm tall with a pitch of 400 nm in a square array. The features had side wall angles of approximately 4 degrees. The coating thickness of Resin D on the film was sufficient to fully wet the nickel surface and form a rolling bead of resin as the coated film was pressed against the nanostructured nickel surface. The film was exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the film was exposed again to radiation from the Fusion UV lamp system.

Step 2: A silicon containing release film layer assembled according to methods described in U.S. Pat. No. 6,696,157 (David et al.) and U.S. Pat. No. 8,664,323 (Iyer et al.) and U.S. Patent Publication No. 2013/0229378 (Iyer et al.) was applied to the nanostructure tooling film in a parallel plate capacitively coupled plasma reactor. The chamber has a central cylindrical powered electrode with a surface area of 1.7 m$^2$ (18.3 ft$^2$). After placing the nanostructured tooling film on the powered electrode, the reactor chamber was pumped down to a base pressure of less than 1.3 Pa (2 mTorr). O$_2$ gas was flowed into the chamber at a rate of 1000 SCCM. Treatment was carried out using a plasma enhanced CVD method by coupling RF power into the reactor at a frequency of 13.56 MHz and an applied power of 2000 watts. Treatment time was controlled by moving the nanostructured tooling film through the reaction zone at rate of 9.1 meter/min (30 ft/min) resulting in an approximate exposure time of 10 seconds. After completing the deposition, RF power was turned off and gasses were evacuated from the reactor. Following the 1st treatment, a 2nd plasma treatment was carried out in the same reactor without returning the chamber to atmospheric pressure. HMDSO gas was flowed into the chamber at approximately 1750 SCCM to achieve a pressure of 9 mTorr. 13.56 MHz RF power was subsequently coupled into the reactor with an applied power of 1000 W. The film was then carried through the reaction zone at a rate of 9.1 meter/min (30 ft/min) resulting in an approximate exposure time of 10 seconds. At the end of this treatment time, the RF power and the gas supply were stopped, and the chamber was returned to atmospheric pressure.

Step 3: Acrylate Resin A was dispensed on the HMDSO-treated patterned film with a syringe pump and a sheet of ST505 was laminated over the top such that the entire patterned area was covered with Acrylate Resin A. Acrylate Resin A was then cured while using a D bulb at room temperature, 20° C. Then the ST505 layer was peeled from the release-treated-nanostructure film. Acrylate Resin A was peeled off the release-treated tooling film, leaving an inverted nanostructure film on the ST505.

Step 4: TiO2 was deposited on the film from step 3 according to the methods described in Step 2 of Example 9.

Prophetic Example 11

Step 1: A photonic structure is prepared according to Example 9.
Step 2: A layer of nanostructured anti-biofouling material is placed on top of the fluorescent enhancement nanostructure by the process described in Example 6. This would result in a top anti-biofouling surface with an array of wells, where the bottom of the wells contains the photonic structures.

Prophetic Example 12

Step 1: A photonic structure is prepared according to Example 10.

Step 2: A layer of nanostructured anti-biofouling material is placed on top of the fluorescent enhancement nanostructure by the process described in Example 6. This would result in a top anti-biofouling surface with an array of wells, where the bottom of the wells contains the photonic structures.

Example 13

Example 4 having the nanohole array with the 360 nm-diameter wells and 430 nm pitch was cut into 1.5 cm squares and placed in a 12 well plate. An amino silane coating solution was prepared by vortex mixing 3-aminopropyltrimethoxysilane (0.4 g), absolute ethanol (18.52 g), acetic acid (80 µl) and deionized water (1.0 g) in a 25 mL glass vial. Then, 2 g of the amino silane solution was injected into each well containing a 1.5 cm-square well sample. The well plate was allowed to stir in a low-speed orbital shaker, which was set at 60 rpm, for 1 hr. The patterned samples were rinsed with ethanol three times, dried with nitrogen and placed in an oven held at 70° C. for 30 minutes.

Figure 15B:
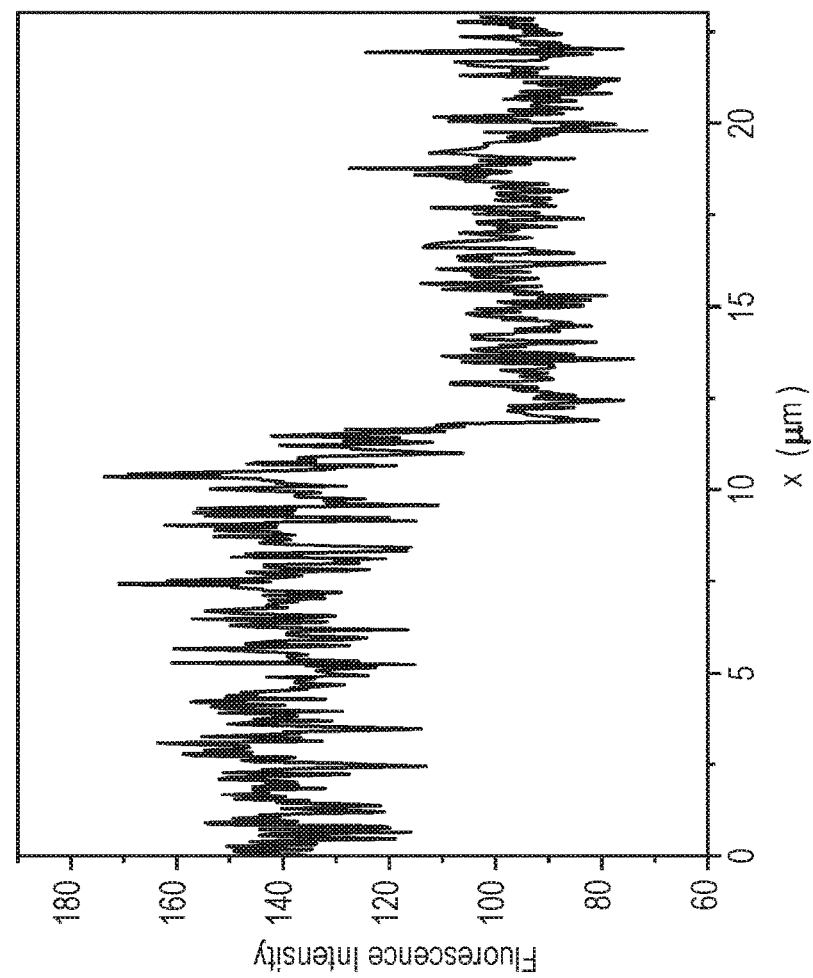
FIG. 15B is the intensity profile which corresponds to the linear trace in FIG. 15A.
Figure 15A:
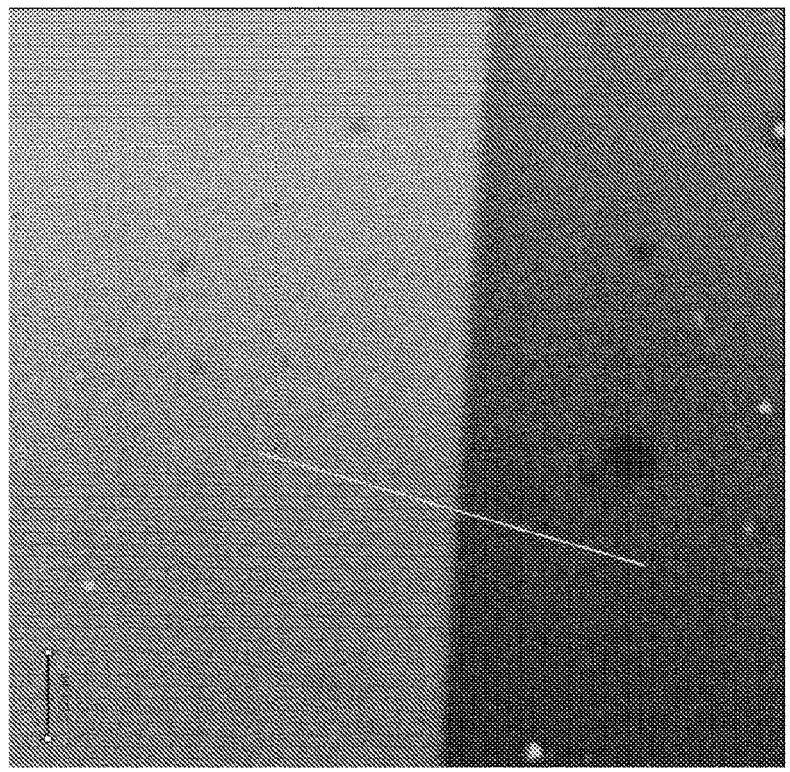
FIG. 15A is a Confocal image of Example 13.

For the fluorescent labeling, the films were placed in a 12 well plate and rinsed with TE buffer pH 8.0 for three times. Approximately 500 µL of a 0.1 mg/mL Alexa Fluor™ 488 NHS ester (succinimidyl ester) in TE buffer pH 8.0 was pipetted onto the surface of the aminosilane-functionalized well samples. The functionalization was set for an hour then the samples were rinsed with TE buffer pH 8.0, dried with nitrogen, and imaged using a confocal microscope as defined in Test Method 1. Taken in photon counting mode (0% gain) and a laser intensity of 6.79%, the confocal image of the interface between the nonpatterned and patterned areas of the film in FIG. 15A and the corresponding intensity profile of the over in FIG. 15B show that there is a difference in fluorescent intensity between the region of the film that has the photonic structure and the region without any structure. The average intensity difference between the regions is 1.6 as analyzed by the LAS X software.

Example 14

Example 5 was functionalized with amino silane and fluorescent Alexa Fluor™ 488 NHS ester dye using the method described in Example 13 and imaged using confocal microscopy as defined in Test Method 1. Taken with a gain of 65.2% gain and 2% laser intensity, the confocal image shows no areas of higher intensity, resulting from mismatch between structure design, fluorophore, and excitation wavelength.

Example 15

Example 9 was cut into 1.5 cm squares and placed in a 12 well plate. An amino silane coating solution was prepared by vortex mixing 3-aminopropyltrimethoxysilane (0.4 g), absolute ethanol (18.52 g), acetic acid (80 µl) and deionized water (1.0 g) in a 25 mL glass vial. Then, 2 g of the amino silane solution was injected into each well containing a 1.5 cm-square well sample. The well plate was allowed to stir in a low-speed orbital shaker, which was set at 60 rpm, for 1 hr. The patterned samples were rinsed with ethanol three times, dried with nitrogen and placed in an oven held at 70° C. for 30 minutes.

For the fluorescent labeling, the films were placed in a 12 well plate and rinsed with 10 mM KP pH 7.0 for three times. Approximately 500 µL of a 0.1 mg/mL Alexa Fluor™ 647

COOH in 10 mM KP pH 7.0 was pipeted onto the surface of the aminosilane-functionalized well samples. The functionalization was set for an hour then the samples were rinsed with 10 mM KP pH 7.0, dried with nitrogen and imaged using a confocal microscope as defined in Test Method 2. Taken at a master gain of 1016 and 45% power, the confocal image shows that there is a patterned fluorescent square array with nodes of higher intensities with peak-to-trough intensity ratios of 8.9:1 as analyzed by the ZEN 2009 software.

Example 16

Figure 16B:
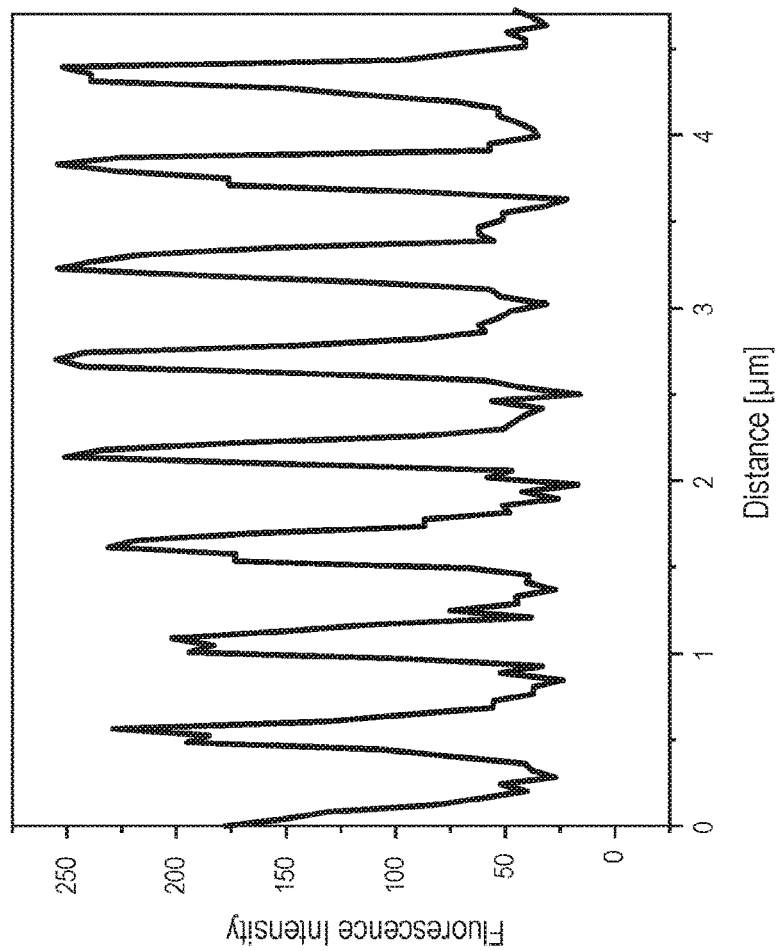
FIG. 16B is the intensity profile which corresponds to the linear trace in FIG. 16A.
Figure 16A:
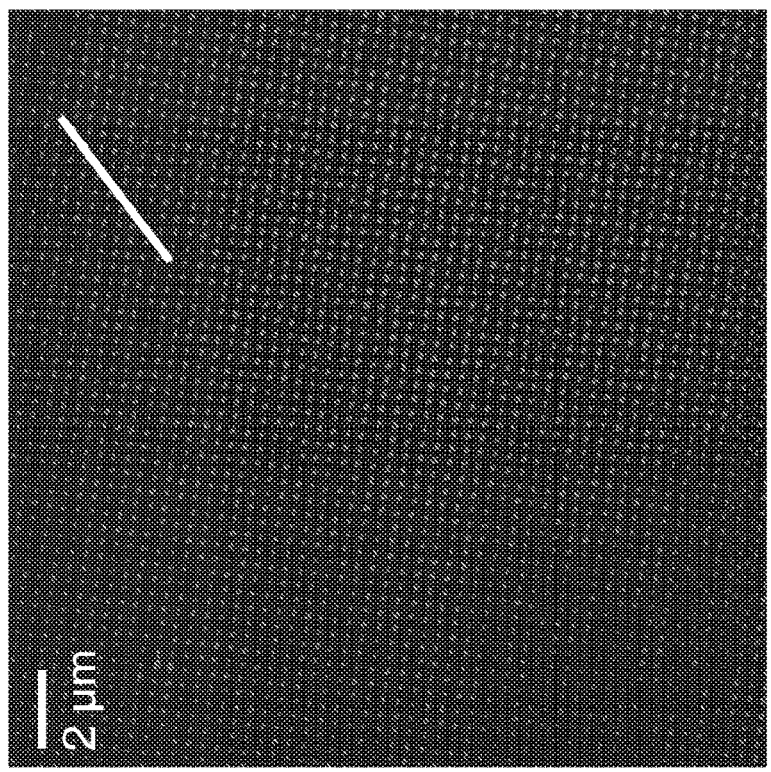
FIG. 16A is a Confocal image of Example 16.

Example 10 was functionalized with amino silane and fluorescent Alexa Fluor™ 647 COOH dye using the method described in Example 15 and imaged using confocal microscopy as defined in Test Method 2. Taken at a master gain of 1059 and 35% power, the confocal image in FIG. 16A and the corresponding intensity profile in FIG. 16B show that there is a patterned fluorescent square array with nodes of higher intensities with peak-to-trough intensity ratios of 5:1 as analyzed by the ZEN 2009 software.

Prophetic Example 17

Example 11 is functionalized with amino silane and fluorescent Alexa Fluor™ 647 COOH dye using the method described in Example 15 to produce a surface with analyte localized on the regions with exposed photonic structure.

Prophetic Example 18

Example 6 is functionalized with amino silane and fluorescent Alexa Fluor™ 488 NHS ester using the method described in Example 13 to produce a surface with analyte localized on the regions with exposed photonic structure.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A film comprising:
   a flexible carrier layer having a first major surface and a second major surface opposite the first major surface;
   a pattern of photonic structure disposed on the first major surface of the flexible carrier layer; and
   an anti-biofouling material layer selectively disposed on the first major surface of the flexible carrier layer whereby an array of openings are formed in the anti-biofouling material layer, the photonic structure being interspersed with the anti-biofouling material layer to provide a pattern of analyte sites provided by the exposed surfaces of the photonic structures via the openings in the antibiofouling material layer,
   wherein the pattern of photonic structure comprises a layer of high-refractive-index dielectric material to support one or more analytes at the analyte sites.

2. The film of claim 1, wherein the analytes are labeled by at least one type of fluorophore having an excitation or emission wavelength, the pattern of photonic structure being configured to be resonant at the excitation or emission wavelength.

3. The film of claim 1, wherein the photonic structure comprises at least one of a photonic crystal structure or an asymmetric metamaterial structure.

4. The film of claim 3, wherein the photonic crystal structure comprises a periodic array of nanowells.

5. The film of claim 3, wherein the asymmetric metamaterial structure comprises an array of unit cell structures with a broken in-plane inversion symmetry, the unit cell structures projecting from a major surface thereof.

6. The film of claim 1, wherein the high-refractive-index dielectric material has a refractive index in a range from 1.7 to 2.8 at the wavelength of 400 nm to 700 nm.

7. The film of claim 1, wherein the high-refractive-index dielectric material comprises an inorganic nanostructured layer, optionally, the inorganic nanostructured layer comprises at least one of $TiO_2$, $Al_2O_3$, $Ta_2O_5$, $ZrO_2$, $Nb_2O_5$, $Si_3N_4$, or $HfO_2$.

8. The film of claim 7, wherein the pattern of photonic structure further comprises a polymer layer comprising a nanostructured surface, and the inorganic nanostructured layer is substantially conformally formed onto the nanostructured surface of the polymer layer.

9. The film of claim 1, wherein the anti-biofouling material layer forms an array of wells aligned with the pattern of analyte sites.

10. The film of claim 1, further comprising a polymer layer disposed on the first major surface of the flexible carrier layer, the polymer layer comprising an array of posts interspersed with recessed features, the pattern of photonic structure being disposed on top surfaces of the posts, and the anti-biofouling material layer being disposed on the recessed features.

11. The film of claim 1, further comprising a coating or polymer disposed on the analyte sites to bind an analyte binding material.

12. The film of claim 1, further comprising an optically clear adhesive layer disposed on the second major surface of the flexible carrier layer.

13. A luminescent imaging device comprising: the film of claim 1; an excitation light source configured to emit an excitation light toward the photonic structure of the luminescent imaging film; and a detection unit configured to obtain an image of the pattern of photonic structure of the luminescent imaging film.

14. A method of making a luminescent imaging film, the method comprising:
providing a flexible carrier layer having a first major surface and a second major surface opposite the first major surface;
providing a pattern of photonic structure disposed on the first major surface of the flexible carrier layer; and
providing an anti-biofouling material layer selectively disposed on the first major surface of the flexible carrier layer whereby an array of openings are formed in the antibiofouling material layer, the photonic structure being interspersed with the anti-biofouling material layer to provide a pattern of analyte sites provided by the exposed surfaces of the photonic structures via the openings in the antibiofouling material layer,
wherein the pattern of photonic structure comprises a layer of high-refractive-index dielectric material to support one or more analytes at the analyte sites.

15. The method of claim 14, wherein the photonic structure comprises at least one of a photonic crystal structure or an asymmetric metamaterial structure.

16. The method of claim 14, wherein the pattern of photonic structure comprises an inorganic nanostructured layer.

17. The method of claim 16, wherein the pattern of photonic structure further comprises a polymer layer comprising a nanostructured surface, and the inorganic nanostructured layer is substantially conformally formed onto the nanostructured surface of the polymer layer.

18. The method of claim 14, wherein the anti-biofouling material layer forms an array of wells aligned with the pattern of analyte sites.

19. The method of claim 14, further comprising disposing a polymer layer disposed on the first major surface of the flexible carrier layer, the polymer layer comprising an array of posts interspersed with recessed features, the pattern of photonic structure being disposed on top surfaces of the posts, and the anti-biofouling material layer disposed on the recessed features.

20. The method of claim 14, further comprising disposing a coating or polymer on the analyte sites to bind an analyte binding material.

* * * * *